(12) United States Patent
Hayashi et al.

(10) Patent No.: US 7,004,421 B2
(45) Date of Patent: Feb. 28, 2006

(54) INSPECTION DEVICE OF WINDING APPEARANCE OF TAPE AND IMPROVEMENT PROCESSING METHOD FOR THE SAME

(75) Inventors: Yoichi Hayashi, Kanagawa (JP); Nobuyuki Tada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 90 days.

(21) Appl. No.: 10/446,136

(22) Filed: May 28, 2003

(65) Prior Publication Data

US 2004/0021096 A1     Feb. 5, 2004

(30) Foreign Application Priority Data

| May 28, 2002 | (JP) | ............................. 2002-153805 |
| Sep. 18, 2002 | (JP) | ............................. 2002-270871 |
| Sep. 18, 2002 | (JP) | ............................. 2002-270873 |

(51) Int. Cl.
*B65H 26/00* (2006.01)
*G01N 21/84* (2006.01)

(52) U.S. Cl. .............. 242/534; 250/559.46; 356/237.2; 382/108

(58) Field of Classification Search ................ 242/534, 242/563; 250/559, 46, 48; 356/237.2, 237.3, 356/376; 382/108
See application file for complete search history.

(56) References Cited

U.S. PATENT DOCUMENTS

| 3,667,846 A | * | 6/1972 | Nater et al. .................. 356/623 |
| 4,565,927 A | * | 1/1986 | Ragle ..................... 250/559.22 |
| 4,589,773 A | * | 5/1986 | Ido et al. ..................... 356/623 |
| 4,679,744 A | * | 7/1987 | Chikamasa et al. ......... 242/534 |
| 5,138,151 A | * | 8/1992 | Inada et al. ............. 250/223 R |
| 5,162,660 A | * | 11/1992 | Popil ..................... 250/559.01 |
| 5,224,172 A | * | 6/1993 | Masai ......................... 382/111 |
| 5,739,904 A | * | 4/1998 | Berger et al. ............. 356/238.2 |
| 5,760,891 A | * | 6/1998 | Graff ....................... 356/237.2 |
| 5,974,160 A | * | 10/1999 | Shiratori et al. ............ 382/108 |

FOREIGN PATENT DOCUMENTS

| JP | 10-269567 A | 9/1998 |
| JP | 2000-337827 A | 8/2000 |

* cited by examiner

*Primary Examiner*—John M. Jillions
(74) *Attorney, Agent, or Firm*—Sughrue Mion, PLLC

(57) ABSTRACT

To provide a winding appearance inspection device of a tape capable of gathering a line speed in an inspection process, as well as capable of inspecting a winding appearance of the tape wound on a roll body core, even in a reel having a flange formed in a roll body core (a roll body core). Winding appearance inspection device 10 serves as a device that evaluates the winding appearance of the tape such as film T or the like wound on roll body core H, comprising light projector 12 that irradiates a light along winding surface S of the tape such as film T or the like that at least partially passes near the roll body core H, and receiver 13 that receives the light.

8 Claims, 21 Drawing Sheets

TO SUCTION DEVICE

US 7,004,421 B2

INSPECTION DEVICE OF WINDING APPEARANCE OF TAPE AND IMPROVEMENT PROCESSING METHOD FOR THE SAME

DETAILED DESCRIPTION OF THE INVENTION

1. Technical Field of the Invention

This invention relates to an inspection device of a tape that inspects a winding appearance such as a magnetic tape or web wound on a roll body core, and an improvement processing method capable of improving a disturbed winding of the tape taken up on a tape reel.

2. Background of the Invention

Generally, a tape in a belt-like form of paper, plastic film, or metal foil, is shipped in a state of taken up on a tape reel. As for the tape thus taken up on the tape reel, when a winding appearance is not in good state, the magnetic tape of good appearance is not obtained, and also the projecting part of the tape from a winding surface formed by tape edges may be damaged when dropped. Therefore, inspection about the winding appearance has been performed conventionally.

The conventional inspection device of the winding appearance is disclosed in JP-A-2000-337827. In the inspection device, the winding appearance is inspected in such a way that light is irradiated from obliquely upward onto a tape winding surface of a printing film or the like wound on a roll body core having no flange, to thereby perform image processing of the reflected light.

Also, the conventional inspection device of the winding appearance of the magnetic tape is disclosed in JP-A-10-269567. The inspection device is installed near the winding surface of the magnetic tape wound on a roll body core having no flange, and absorb the accompanying air flowing at the time of travel winding of the tape along the winding surface, to thereby measure pressure of the air. Namely, in the inspection device, when the magnetic tape projects from the winding surface, for example, the magnetic tape functions so as to resist to the flow of the air. Therefore, by measuring low pressure due to the air resistance, it is clarified that the magnetic tape projects from the winding surface.

In addition, FIG. 1 to FIG. 3 are views showing one example of the magnetic tape which is wound on a tape reel, FIG. 1 is a perspective view showing one example of the tape reel, FIG. 2 is a sectional view taken along the line A—A in FIG. 1, and FIG. 3 is a sectional view showing a disturbed winding generated in the tape reel shown in FIG. 2.

As shown in FIG. 1 and FIG. 2, tape reel R is constituted including cylindrical roll body core H, an upper flange F1 and lower flange F2 which are fixed in a mutually facing manner to the lower end H2 and upper end H1 of the roll body core H, wherein the magnetic tape MT is wound on outer periphery H3 of the roll body core H.

Here, the interval of the upper flange F1 and the lower flange F2 is set a little bit wider than the width of magnetic tape MT, so as to prevent damage caused by one tape edge E1 or the other tape edge E2 of the magnetic tape MT by abutting on inner surface F11 of upper flange F1, or inner surface F21 of lower flange F2. For this reason, the so-called "disturbed winding", presenting the uneven tape edge E1 (or E2), may arise (see FIG. 3).

However, in an inspection device that inspects a winding appearance disclosed in JP-A-2000-337827, the inspection of the winding appearance is enabled when the flange formed in the roll body core is transparent, whereas, when the flange is opaque, it is impossible to inspect the winding appearance of the magnetic tape. On the other hand, in an inspection device that inspects the winding appearance disclosed in JP-A-10-269567, it is necessary to be installed near the winding surface of the magnetic tape. Therefore, when the flange is provided in the roll body core, the winding appearance of the magnetic tape cannot be inspected. Moreover, in this device, it takes time for the measuring device to be approached to the magnetic tape or spaced apart therefrom, or it takes time for the pressure to be stabilized after suction of the air is performed. Therefore, line speed in the process of the winding appearance inspection is decelerated.

Moreover, when the tape is taken up on the tape reel already incorporated in the cassette, in order to improve disturbed winding, a method for mitigating the disturbed winding by using an endless belt and a touch roll cannot be used. In addition, even if the winding appearance of the tape is improved by using the endless belt or the touch roll, the disturbance may be generated while repeatedly using the tape. That is, there is involved a problem such that the winding appearance of the magnetic tape MT can not be maintained in a fixed winding appearance.

SUMMARY OF THE INVENTION

A first object of this invention is to provide an inspection device of a winding appearance of a tape (magnetic tape) capable of gathering a line speed in the inspection process, as well as capable of inspecting a winding appearance of a tape wound on the roll body core, even in a reel having a flange formed in the roll body core.

In addition a second object of this invention is to provide a winding appearance improvement processing method of the magnetic tape capable of maintaining the winding appearance of the magnetic tape in a fixed winding appearance.

In order to overcome the first problem, the winding appearance inspection device of the tapes, that inspects the winding appearance of the tape wound on the roll body core, comprises a light projector that irradiates a light that partially passes near the roll body core at least along the winding surface of the tape, and a receiver that receives the light from the light projector.

Here, "winding surface" means the surface formed at the edge of the width direction of the tape wound on the roll body core, that is, the winding surface serving as a reference value set up beforehand by assuming the ideal wound state of the tape on the roll body core.

According to one exemplified aspect of the present invention, there is provided a winding appearance inspection device of the tape, for example. When the winding appearance of the tape wound on the roll body core having an opaque flange is inspected, by irradiating the light from the light projector along the winding surface of the tape, the light arrives at the receiver passing through between the winding surface and the flanges. Here, the light partially passes near the roll body core, and when the tape projects from the winding surface, the light is certainly interrupted by this projected tape, and the quantity of the light received by the receiver decreases compared with a regular state without the projected tape. Accordingly, even if the tape is wound on the roll body core having an opaque flange formed, the winding appearance can be inspected certainly.

Also, in order to overcome the first problem, in the above winding appearance inspection device of the tape that inspects the winding appearance of the tape wound on the roll body core, the position where the light is received by the receiver, the quantity of the light, or time that takes the light to arrive at the receiver from the light projector is measured, to thereby recognize the position of the tape that projects from the winding surface.

According to the above exemplified aspect of the present invention, there is provided an inspection device of the winding appearance of the tape. Wherein when the winding appearance of the tape wound on the roll body core having an opaque flange is inspected, by irradiating the light along the winding surface of the tape from the light projector, the light arrives at the receiver passing through between the winding surface and the flange, and when the tape projects from the winding surface, the light arrives at the receiver by being reflected by the tape. Then the position where the light is received by the receiver, the quantity of the light, or time that takes the light to arrive at the receiver from the light projector is measured, to thereby recognize the position of the tape projecting from the winding surface.

According to another exemplified aspect of the present invention, there is provided a winding appearance inspection device of the tape. When the winding appearance of the tape wound on the roll body core having a flange is inspected, by irradiating the light along the winding surface of the tape from the light projector, the light passes through between the winding surface and the flange, and when the tape projects from the winding surface, the light shines upon this tape. Then focalizing the image pick-up device in relation to the tape upon which the light shines, the position of the tape is recognized by computing distance from the tape that projects from the winding surface based on the focal distance at that time.

According to another exemplified aspect of the present invention, there is provided an inspection device of the winding appearance of the tape, wherein for example, when the winding appearance of the tape wound on the roll body core having a flange is inspected, and when the winding appearance is in a regular state, then if light is irradiated along the winding surface of the tape from the light projector, the light passes through between the winding surface and the flange to be irradiated onto the roll body core. And the light reflected by the roll body core is dispersed by the coarseness of the surface of the roll body core and imaged by the image pick-up device as a light serving as big width. On the other hand, when the tape projects from the winding surface, the light irradiated from the light projector shines upon the tape. Here, when this tape is a magnetic tape, for example, the surface is formed in a mirror surface state. Therefore, the light reflected by the tape is not dispersed but imaged by the image pick-up device as a light with small width. Therefore, the winding appearance of the tape can be inspected by differentiating the surface coarseness of the roll body core and the tape. In addition, the surface coarseness of the roll body core and the tape does not necessarily need to be differed. For example, even if the coarseness of the surface is substantially the same, it is distinguishable whether the light is from the roll body core, or from the projected tape, by the direction of the light irradiated onto the image pick-up device.

In order to overcome the second problem, in the winding appearance improvement processing method of the magnetic tape, after predetermined quantity of the magnetic tape is taken up on the roll body core of the tape reel, predetermined time heat treatment of the magnetic tape is applied at a temperature just below a glass transition temperature of the material used for a support base of the magnetic tape, so that a natural curl may be effectively formed.

According to another exemplified aspect of the present invention, there is provided a winding appearance improvement processing method of the magnetic tape. Wherein after predetermined quantity of the magnetic tape is taken up on the roll body core of the tape reel, predetermined time heat treatment of the magnetic tape is applied at a temperature just below a glass transition temperature of the material used for a support base of the magnetic tape, so that a natural curl may be effectively formed in the winding appearance of the magnetic tape taken up on the tape reel. Thus, the winding appearance of the magnetic tape can always be maintained in a good winding appearance. Consequently, the disturbed winding appearance of the magnetic tape taken up on the tape reel is avoided, when using the magnetic tape cartridge constituted including the tape reel.

The temperature just below a glass transition temperature in the above winding appearance improvement processing method of the magnetic tape, is set to be lower than a glass transition temperature by about 5 to 10° C.

In addition, according to the exemplified aspect of the present invention, there is provided a winding appearance improvement processing method of the magnetic tape. Wherein predetermined time heat treatment of the magnetic tape is applied at a temperature lower than a glass transition temperature of the material used for the support base of the magnetic tape by 5 to 10° C., so that a natural curl may be effectively formed. Especially when polyethylene terephthalate (PET) and polyethylene naphthalate (PEN) are used for the support base of the magnetic tape, by applying the heat-treatment onto the magnetic tape at a temperature just below a glass transition temperature, the natural curl may be more effectively obtained.

In another example of the winding appearance improvement processing method, after taking up the magnetic tape on a roll body core of the tape reel, the winding appearance of the magnetic tape taken up on the tape reel is inspected. And when an inspection result is a failure, after the magnetic tape is un-wound on the tape reel, the taken-up posture of the magnetic tape is inspected again.

BRIEF DESCRIPTION OF THE DRAWINGS

FIG. 17B is a sectional view showing a state of the magnetic tape taken up on a reel which is formed by a lower flange that is gradually inclining from inner side to outer side, so as to be closed to the lower flange side.

PREFERRED EMBODIMENT OF THE INVENTION

Preferred embodiment of an inspection device of a winding appearance according to this invention will be explained in conjunction with FIGS. 4 to 5.

First Embodiment

By applying the present invention, this embodiment shows a winding appearance inspection device of film T (tape) wound on roll body core H (roll body core) of tape reel R. Wherein upper flange F1 and lower flange F2 are formed on both ends of the roll body core (roll body core) H.

Figure 4:
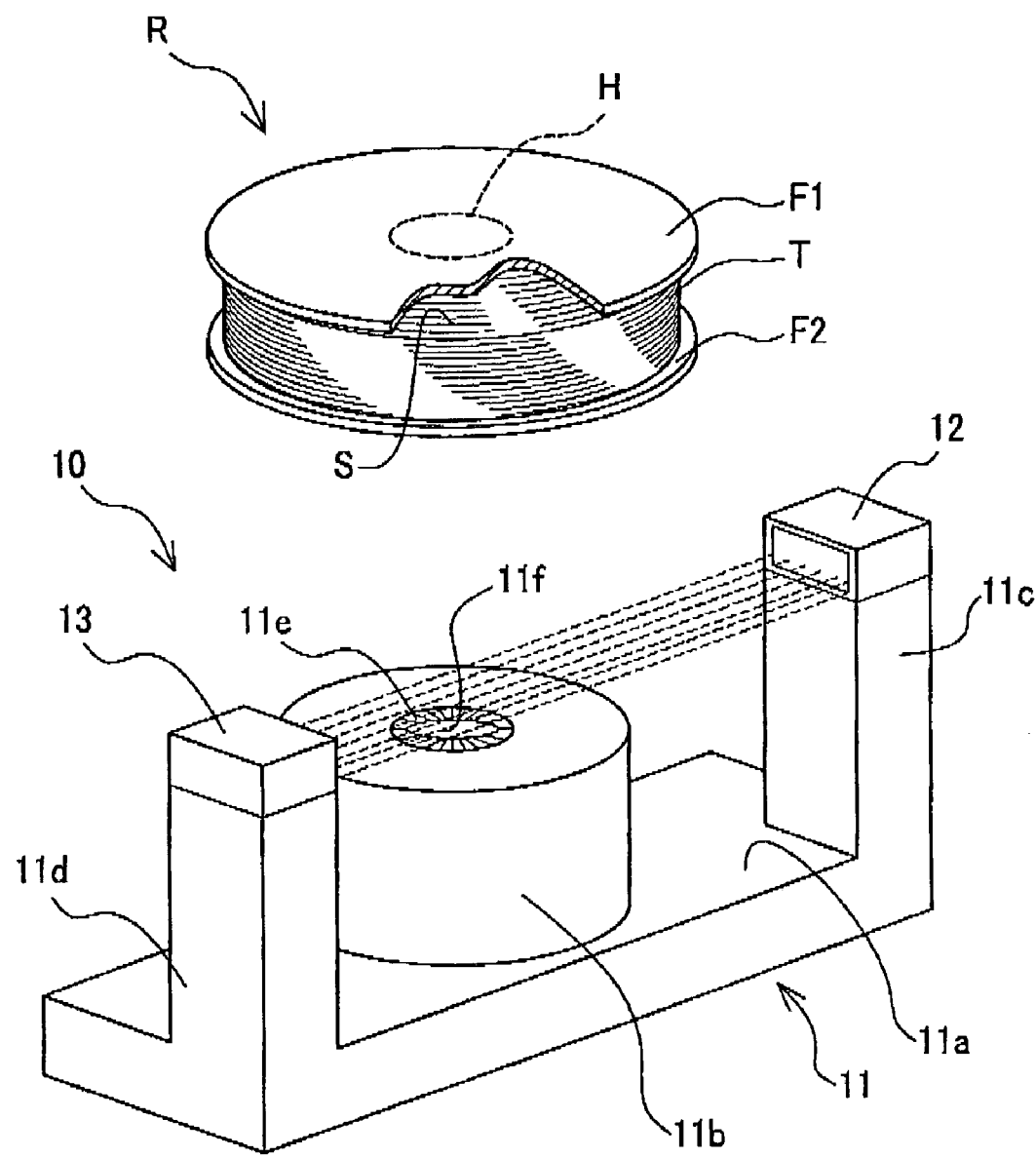
FIG. 4 is a perspective view showing an inspection device of a winding appearance according to a first embodiment.

As shown in FIG. 4, winding appearance inspection device 10 of this invention mainly includes a main body 11, a light transmissive device 12, and a receiver 13. The main body 11 mainly includes a base part 11a formed in a nearly rectangular form in plan view, a reel installation part 11b for installing the tape reel R, a light transmissive device installation part 11c for installing the light transmissive device 12, and a light receiver installation part 11d for installing the light receiver 13.

The reel installation part 11b is formed so that it may project from nearly the center of the base part 11a. The face gear, which is not shown, for receiving rotation driving force is formed on the undersurface of the tape reel R. On the upper surface of the reel installation part 11b, face gear 11e meshing with the face gear of the tape reel R is formed. In addition, a suction hole 11f for suction of the tape reel R so as to be fixed is formed. Namely, by way of suitable suction by a suction device, which is not shown, formed in the lower part of the suction hole 11f, the tape reel R is detachably secured on the upper surface of the reel installation part 11b.

Light projector installation part 11c is formed in one angle part of the base part 11a so as to project, and light projector 12 is fixed to its upper surface. Moreover, the receiver installation part 11d is formed in one angle part of the base part 11a so as to project similarly to the light projector installation part 11c, and on its upper surface, the receiver 13 is fixed. And the light projector installation part 11e and the receiver installation part 11d are formed in a facing manner interposing the reel installation part 11b therebetween. More specifically, the light projector installation part 11c and the receiver installation part lid are formed in a facing manner interposing a position shifted from the center of the reel installation part 11b by a prescribed distance. Moreover, the light projector installation part 11c and the receiver installation part 11d are formed more highly than the upper surface of the reel installation part 11b by a predetermined distance. Namely, when the tape reel R is installed on the upper surface of the reel installation part 11b, the installation parts 11b to 11d are formed, so that the light irradiated from the light projector 12 may pass along the winding surface S of the film T in the tape reel R.

Figure 5:
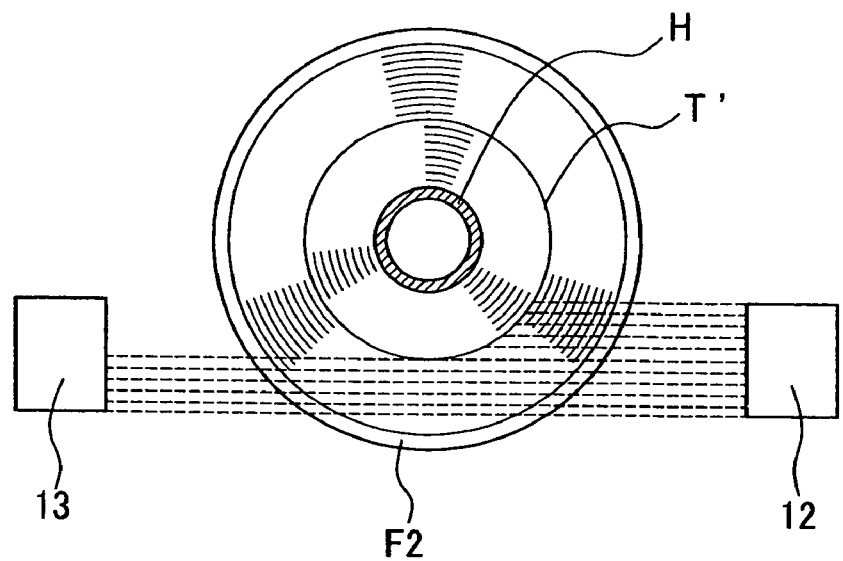
FIG. 5 is a plan view showing the inspection device of FIG. 1.
Figure 6:
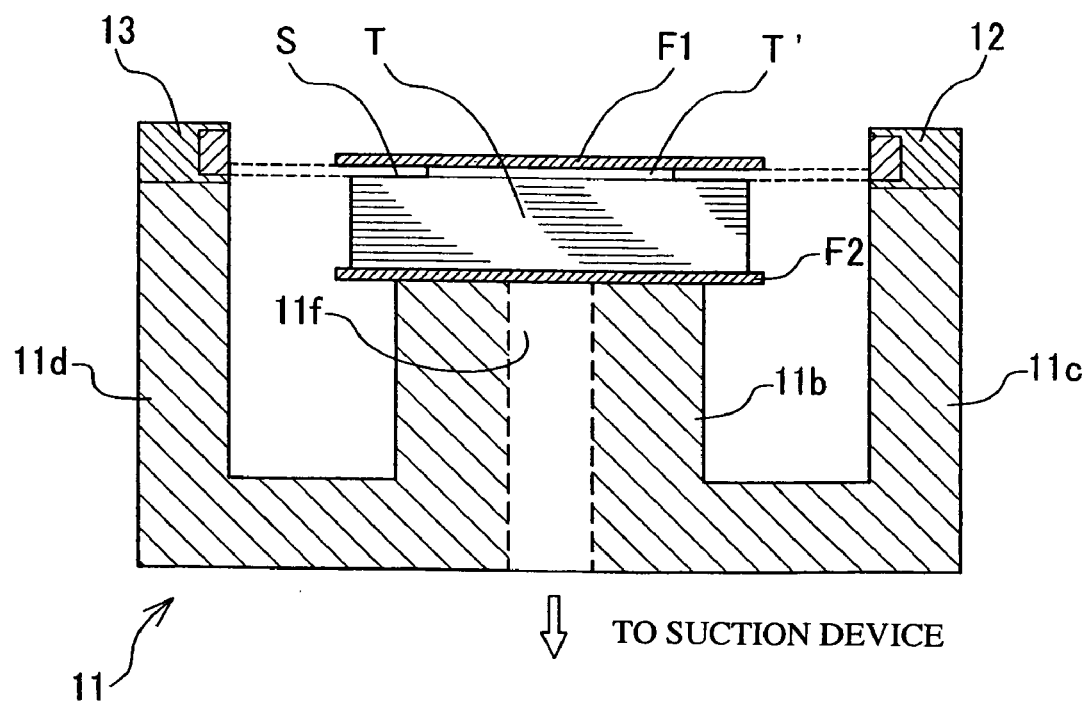
FIG. 6 is a sectional view showing the inspection device of FIG. 1.

The light projector 12 serves as a device that irradiates a light toward the receiver 13, and as shown in FIG. 5, irradiates a parallel light of width that passes the range covering from the roll body core H to the outermost layer of the film T. Also, as shown in FIG. 6, the light projector 12 irradiates the light of height that passes the range covering from the winding surface S which is formed by the film T in the tape reel R installed in the reel installation part 11b to the upper flange F1, along the winding surface S. Incidentally, the light projector 12, as shown in FIG. 4, may not irradiate the light in the shape of a curtain, but may irradiate the light in the shape of spot, if irradiating the light at least toward the portion near the roll body core H of the gap between the upper flange F1 and the winding surface S.

The receiver 13 receives the light from the light projector 12, the quantity of the light received is detected and its signal is outputted to a controller which is not shown. And the position of film T' that projects from the winding surface S is recognized by the controller.

Next, the winding appearance inspection method by using the winding appearance inspection device 10 will be explained.

First, as shown in FIG. 4, the tape reel R around which the film T is wound one-sidely toward the lower flange F2 is installed in the reel installation part 11b. And as shown in FIG. 6, if the light is irradiated from the light projector 12 along the winding surface S, the light passes through between the winding surface S and the upper flange F1, then arrives at the receiver 13. At this time, if the film T' projects from the winding surface S, the light is partially interrupted by this projected film T'. Therefore, the quantity of the light received by the receiver 13 is decreased compared with the quantity of the light in a regular state without the projected film. And when the signal detected by the light-receiver 13 is outputted to the controller, the position of the film T' that projects from the winding surface S is computed by the controller. Here, projecting film T and the quantity of light, as shown in FIG. 5, is related in such a way that the more the position of the projected film T' separates from the roll body core H in the radius direction, the more the quantity of the light received by the light receiver 13 is decreased. Therefore, based on the quantity of the light received by the light-receiver 13, the position of the film T' is computed by the controller.

Incidentally, when spot-like light is irradiated only to the place near the roll body core H, when projecting film T' exists, the light is interrupted by the film T', a weak light is received or not received by the light receiver 13. Therefore, the existence of film T' projected based on the quantity of the light received by the light-receiver 13 is detected.

According to the above, the following effects can be obtained in the first embodiment.

According to this embodiment, even in the tape reel R having flanges F1 and F2 formed in the roll body core H, the light may be irradiated between the upper flange F1 and the winding surface S of the film T. Therefore, the winding appearance of the film T wound on the roll body core H can be inspected. Also, in order to inspect the winding appearance, what is necessary is just to irradiate the light. Therefore, it is not necessary to move the device or wait until pressure is stabilized as conventionally performed. Thereby, the line speed in the inspection process can be gathered.

Second Embodiment

This embodiment presents an inspection device that inspects a winding appearance of magnetic tape cartridge C having two tape reels R of the first embodiment. The components and portions of the same designation as those in the drawings used for the explanation for the first embodiment are designated the same numerals and signs, omitting and simplifying the overlapping explanation.

Figure 7:
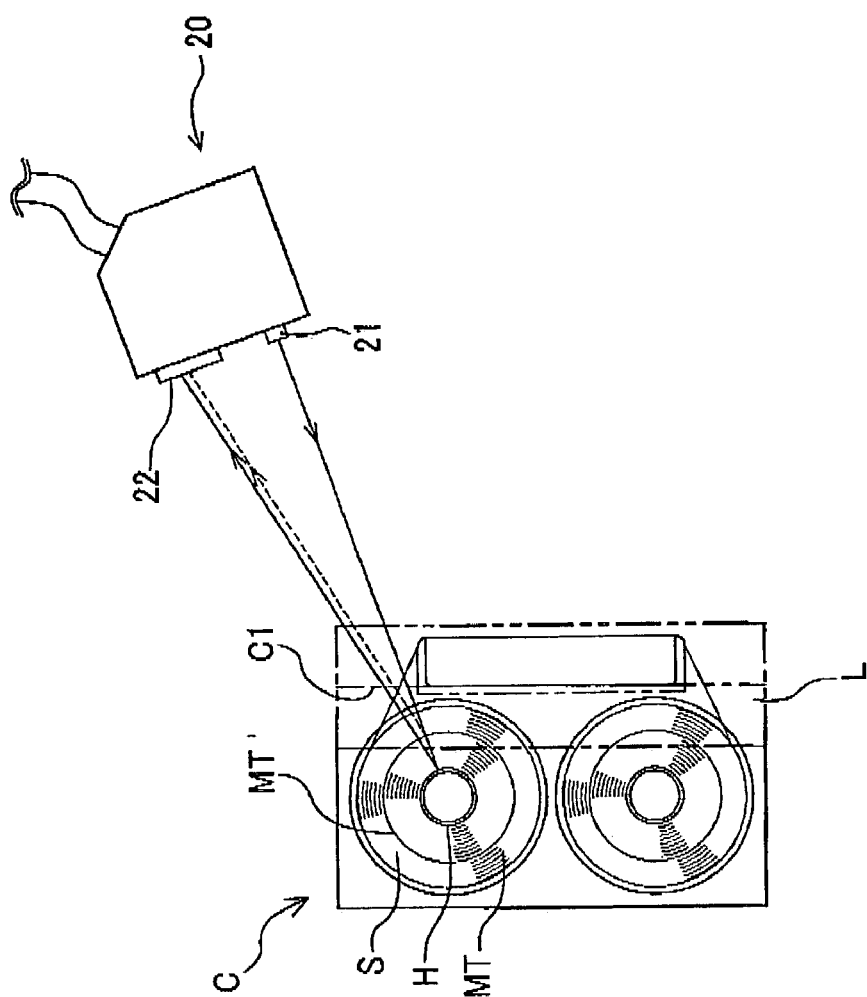
FIG. 7 is a plan view showing the inspection device according to the second embodiment.

As shown in FIG. 7, a winding appearance inspection device 20 mainly includes a light projector 21 that irradiates light along the winding surface S of the magnetic tape (tape) toward roll body core H, and a receiver 22 that receives the light from the light projector 21 which is reflected by projecting magnetic tape MT'. The light projector 21 is installed so that the light may be irradiated from the exterior of magnetic tape cartridge C to roll body core H of inside. Therefore, the light projector 21 is installed in the position whore the roll body core H of inside can be examined with opening lid L of the magnetic tape cartridge C. Namely, the light irradiated from the light projector 21 passes through gap C1 for outwardly extracting the magnetic tape MT of the tape reel R, heading toward the roll body core H as passing outwardly extracted magnetic tape MT and the upper side of the winding surface S of the magnetic tape MT.

In order to receive the light from the light projector 21 which is reflected by the roll body core H of inside of the magnetic tape cartridge C, or by magnetic tape MT' that projects from the winding surface S, the light projector 21 is installed in the position where the inside of the roll body core H can be examined with opening the lid L of the magnetic tape cartridge C. Namely, the light reflected by the roll body core H, or the magnetic tape MT' that projects from the winding surface S passes through the gap C1 of the magnetic cartridge C, heading toward the receiver 22 as passing the upper side of the winding surface S and the magnetic tape MT which is extracted outside. In addition, the receiver 22 has a predetermined width so as to be capable of receiving even the light reflected from the magnetic tape MT' that projects in the outermost layer of the magnetic tape MT.

The receiver 22 receives and detects the light and detects the position of the light, then outputs the light to the controller which is not shown. And the distance to the magnetic tape MT' that projects from the winding surface S is computed based on the position of the light obtained by the controller, and the position is recognized.

Next, the winding appearance inspection method by using the winding appearance inspection device 20 will be explained.

Figure 8:
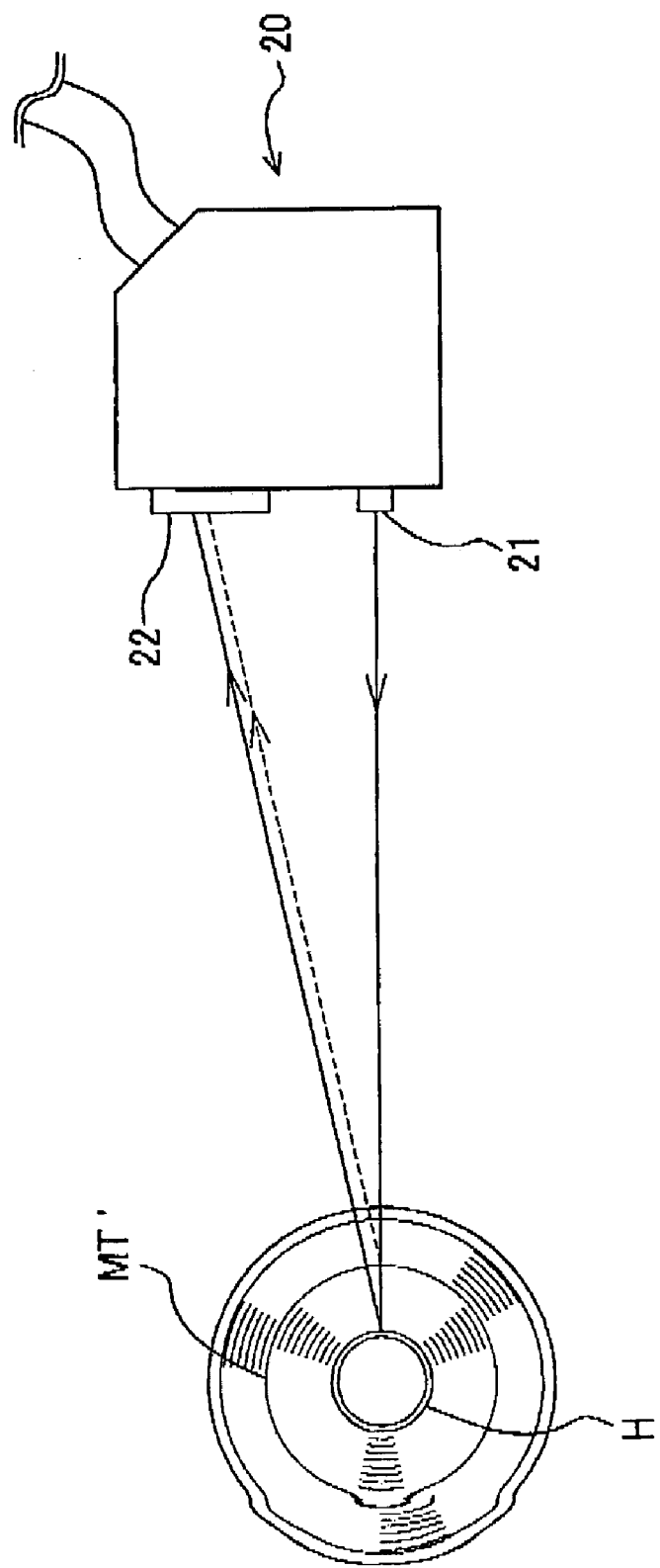
FIG. 8 is a major structure of a winding appearance inspection device of FIG. 4 by way of enlarged view, showing a state for inspecting a position of a magnetic tape that projects from a winding surface.

First, as shown in FIG. 7, the magnetic tape cartridge C is set to a predetermined position capable of inspecting by using the winding appearance inspection device 20. And when the magnetic tape MT' does not project from the winding surface S at this time, the light irradiated from the light projector 21 along the winding surface S is reflected by the roll body core H and received in a predetermined position of the receiver 22. On the other hand, when the magnetic tape MT' projects from the winding surface S, as shown in FIG. 8, the light irradiated from the light projector 21 to the roll body core H is reflected by the magnetic tape MT' and received at a predetermined position of the receiver 22. And when the position of the light received by the receiver 22 is outputted to the controller as signal, the distance from the winding surface S to the projecting magnetic tape MT' is computed by the controller based on the signal, and the position is recognized.

Figure 9:
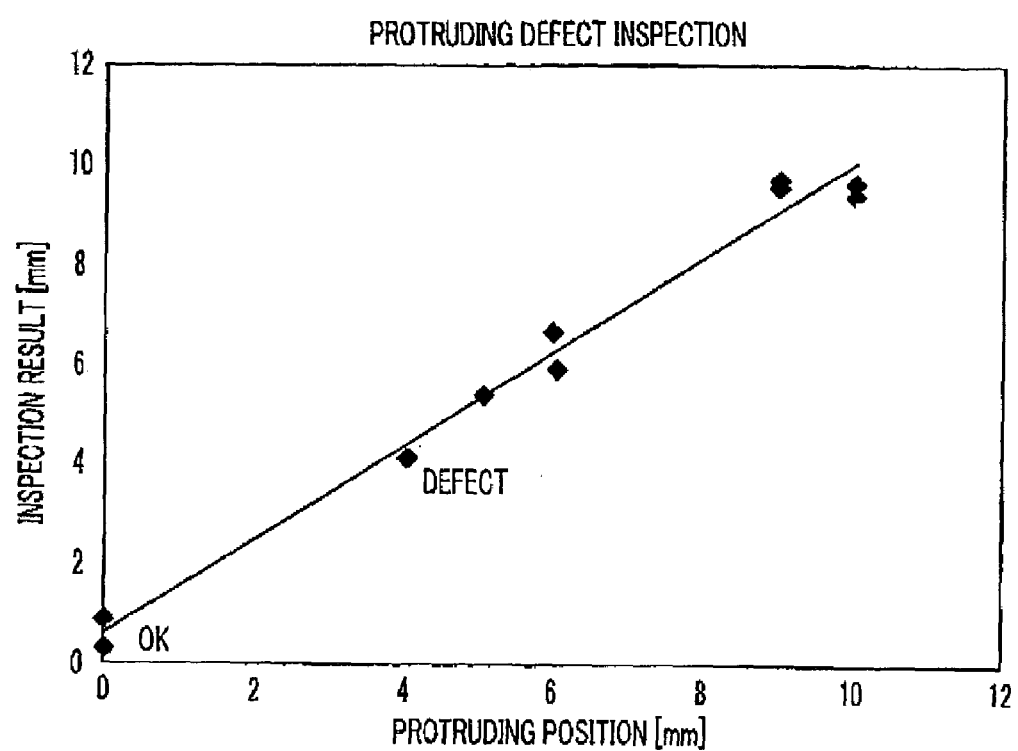
FIG. 9 is a graph that compares the result detected by the winding appearance inspection device of FIG. 4 and an actual measurement value.

Here, the position of the light and the projecting magnetic tape MT' are related in such a way that the more the position of the magnetic tape MT' approaches the outermost layer, the further position from the position of the light reflected by the roll body core H is detected. Thereby, based on the position of the light detected by the receiver 22, the position of the magnetic tape MT' is computed by the controller. The result thus computed by the controller is shown in a graph of FIG. 9. In the graph shown in FIG. 9, the value obtained by converting the result detected by the receiver 22 into the distance from the roll body core H by the controller is shown by the vertical axis. The result obtained by measuring the distance to the magnetic tape MT' that projects from the roll body core H is shown by the horizontal axis. Thereby, the value detected by the receiver 22 and the actual position are nearly matched, therefore the position of the projecting magnetic tape MT' is certainly recognizable by the winding appearance inspection device 20. In addition, OK/NG is distinguishable by determining OK when the light is reflected on the surface of the roll body core H, and determining NG when the light is reflected on the other place. The term "OK" stands for the magnetic tape MT' of the allowable level in the winding appearance, and "NG" stands for the magnetic tape MT' of the unallowable level in the winding appearance.

Incidentally, not applying only to the position of the light, the position of the roll body core H or the projecting magnetic tape MT' may be measured by measuring the time from projecting the pulse light by the light projector 21 to receiving the pulse light by the receiver 22.

According to the above, the following effects can be obtained in the second embodiment. According to this embodiment, the position of the magnetic tape MT' that projects from the winding surface S is recognizable from the position of the reflected light, therefore the diameter of a light irradiated from the light projector 21 can be made small. Therefore, the winding appearance can be inspected within the magnetic tape cartridge C from the narrow gap C1 formed in the magnetic tape cartridge C having two tape reels R.

Third Embodiment

Figure 10:
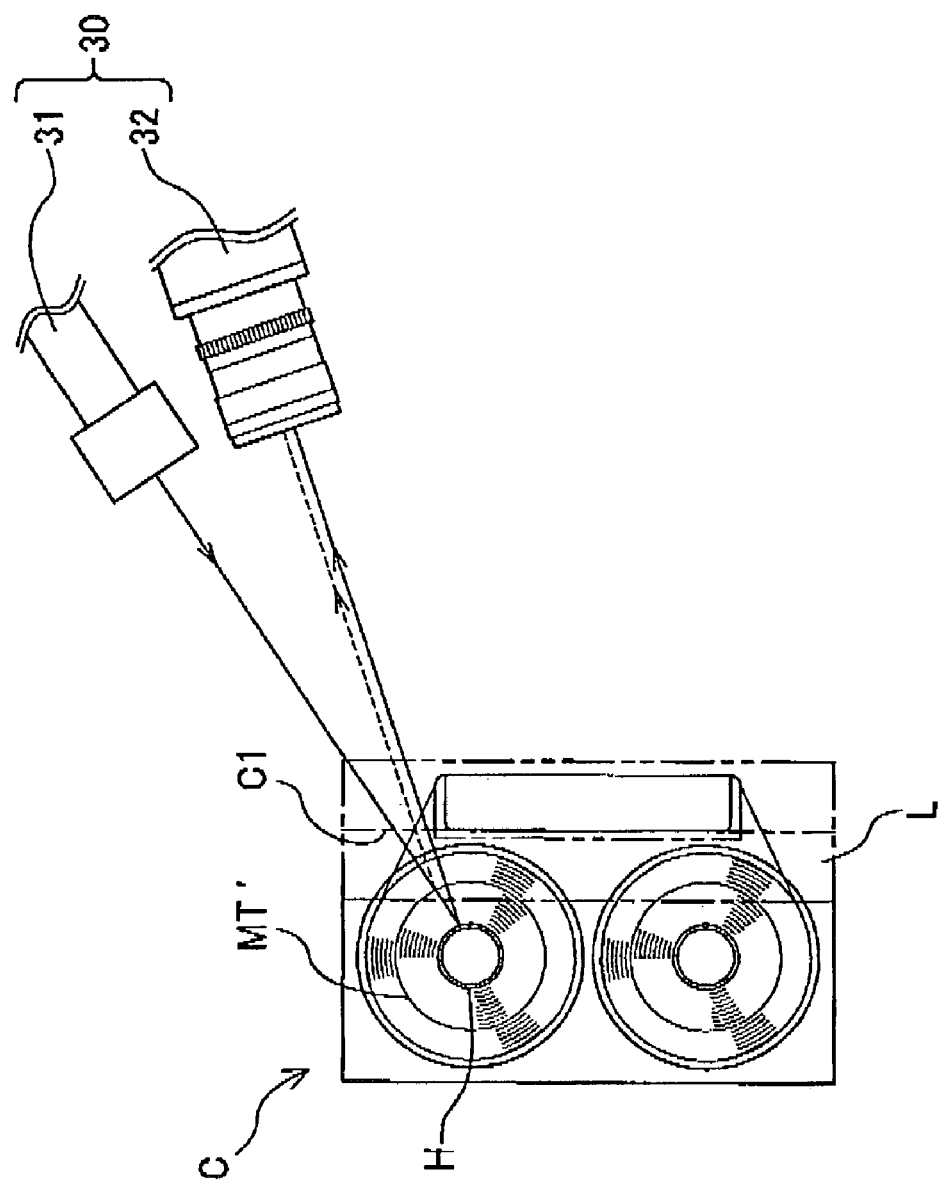
FIG. 10 is a plan view showing a winding appearance inspection device according to a third embodiment.

This embodiment, as shown in FIG. 10, presents an inspection device of the winding appearance of the magnetic tape cartridge C of the second embodiment. Therefore, the components and portions of the same designation as those in the drawings used for the explanation for the second embodiment are designated the same numerals and signs, omitting and simplifying the overlapping explanation.

As shown in FIG. 10, an winding appearance inspection device 30 mainly includes a lighting device 31 (light projector) that irradiates the light heading for the roll body core H along the winding surface S of the magnetic tape MT, and a CCD camera (imaging device) 32 that images the light from the lighting device 31 reflected by the magnetic tape MT' that projects from the roll body core H and the winding surface S. Lighting device 31 is a small device using an optical fiber. Therefore, if only a luminescence portion is protruded and fixed, the installation to a narrow place is possible. Moreover, the lighting device 31 is installed so that its optical axis may head for the roll body core H through the gap C1 opened when opening the lid L of the magnetic tape cartridge C.

In order to image the light reflected by the magnetic tape The CCD camera 32 is installed in the position capable of seeing the roll body core H of inside with opening the lid L of the magnetic tape cartridge C. That is, the light reflected by the roll body core H, or the magnetic MT' that projects from the winding surface S, passes the gap C1 of the magnetic tape cartridge C, and imaged by the CCD camera 32.

Also, the CCD camera 32 outputs the imaged picture (size and position of the light) to the image processing device (not shown) as a signal. And by this image processing device, the existence of the magnetic tape MT' that projects from the winding surface S, and the position of the projecting magnetic tape MT' are recognized based on the size and the position of the light.

Next, the winding appearance inspection method by using the winding appearance inspection device 30 will he explained.

Figure 11:
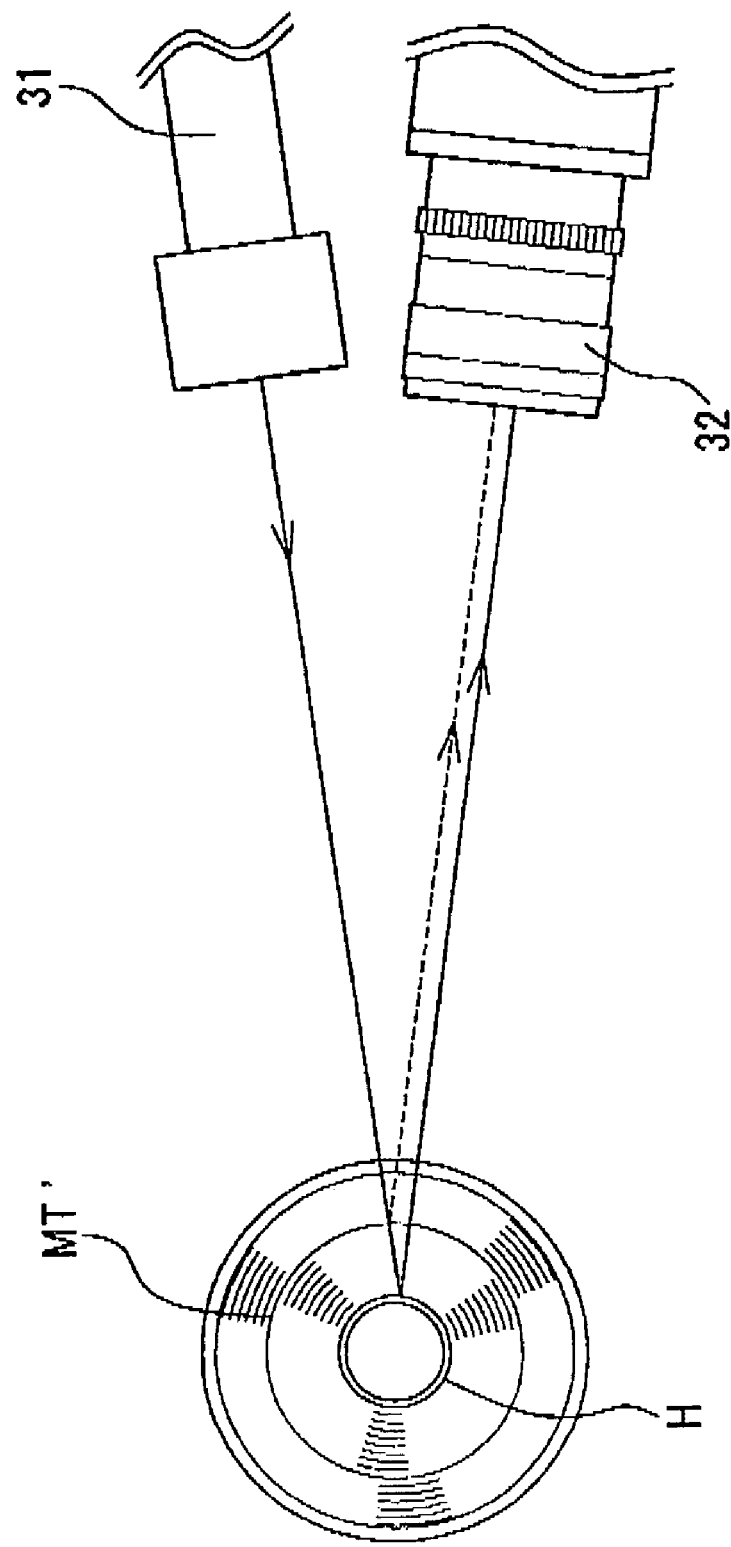
FIG. 11 is a major structure of the winding appearance of FIG. 7 by way of enlarged view showing an imaging state of the magnetic tape that projects from the winding surface.

First, as shown in FIG. 10, the tape cartridge C is set up to the predetermined position capable of inspecting by using the winding appearance inspection device 30. And in case of having no magnetic tape MT' projecting from the winding surface S, by the light irradiated along the winding surface S from the lighting device 31, the light is reflected by the roll body core H and imaged by the CCD camera 32. On the other hand, in case of having the magnetic tape MT' that projects from the winding surface S, as shown in FIG. 11, the light irradiated from the lighting device 31 to the roll body core H, is reflected by the magnetic tape MT' and imaged by the CCD camera 32.

Figure 12A:
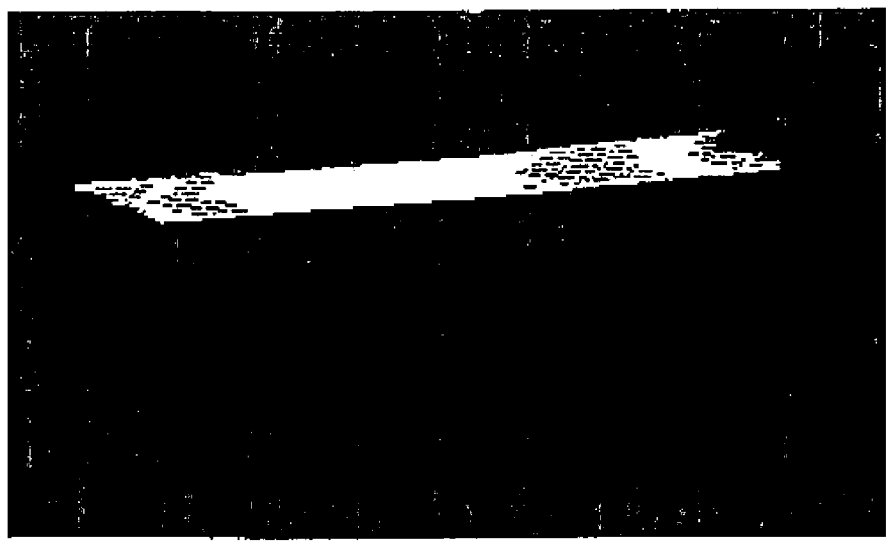
FIG. 12 is a view showing an image which is imaged by the CCD camera of FIG. 7, wherein image of OR is shown in FIG. 9A, and image of NG is shown in FIG. 9B.
Figure 12B:

In the above way, in the picture imaged by the CCD camera 32, as shown in FIG. 12A, in case of having no magnetic tape projecting from the winding surface S, the light reflected by the roll body core H is dispersed by the surface of the roll body core H having more coarseness than the magnetic tape MT, producing a light image of large width. On the other hand, in case of having the magnetic tape MT' projecting from the winding surface S, the light is not dispersed due to the surface of the magnetic tape MT' which is formed in a mirror surface state, and as shown in FIG. 12B, producing a light image of comparatively small width. That is, when imaging the light of large width, the winding appearance is regarded as a regular posture (regarded as OK). On the other hand, when imaging the light of small width, the projecting state of the magnetic MT' (regarded as NG) is recognized by the image processing device.

Figure 13:
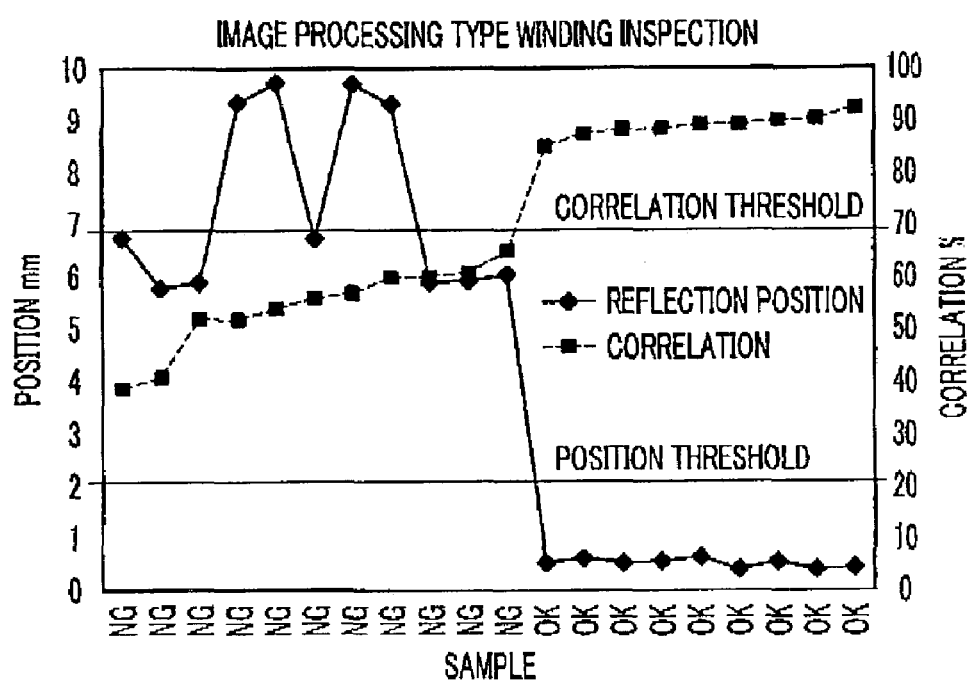
FIG. 13 is a graph showing the result of the subsequent inspection on the basis of the image of O.K.

In addition, based on a predetermined position of the ranges of the light in the image regarded as OK. And OK-NG can also be distinguished by measuring how much the imaged light is shifted in range by the image processing device. Thus, the result of the subsequent inspection based on the image regarded as OK is shown in a graph of FIG. 13. In the graph of FIG. 13, the sample of the result of inspecting the winding appearance of the magnetic tape is shown as a horizontal axis, and a reflective position (solid line) is plotted as a left-hand side vertical axis, while correlation (broken line) is plotted as a right-hand side vertical axis. Incidentally, the correlation stands for the value for determining whether samples to be examined are OK or NG, and means the value obtained by calculating the correlation between the imaged picture regarded as OK serving as a reference, and the imaged picture of a sample, showing that higher value of the correlation means the more approximating state with the image regarded as OK. In addition, as for the reflective position, the more the reflective light is shifted right in relation to the imaged picture serving as a reference regarded as OK, the larger value is plotted.

As shown in this graph, OK/NG is distinguishable by comparing both of the position of the light imaged on the picture and the correlation. That is, when the reflective position is within a predetermined range (about 0 to 2 mm), and the correlation is beyond a predetermined value (about 70%), the image may be regarded as OK, and the other image may be regarded as NG.

According to the above, the following effects can be obtained in the third embodiment.

According to this embodiment, the winding appearance of the magnetic tape MT' can be inspected by the image processing, and the whole size of the winding appearance inspection device 30 may be compact, by employing the lighting device 31 using an optical fiber. That is, even in the magnetic tape cartridge with narrow opening for applying light to a reel, the inspection of the winding appearance is possible.

Incidentally, the winding appearance inspection device of a tape according to this invention is not limited to the embodiments, but may be modified and applied in various ways.

(1) In the second embodiment, the position of the magnetic tape MT' that projects from the winding surface S is computed based on the position of the light reflected, however this invention is not limited thereto. For example, the position of the magnetic tape MT' that projects from the winding surface S may be computed by measuring the time taken by the light irradiated from the light projector 21 of the second embodiment to arrive at the receiver 22.

Figure 14:
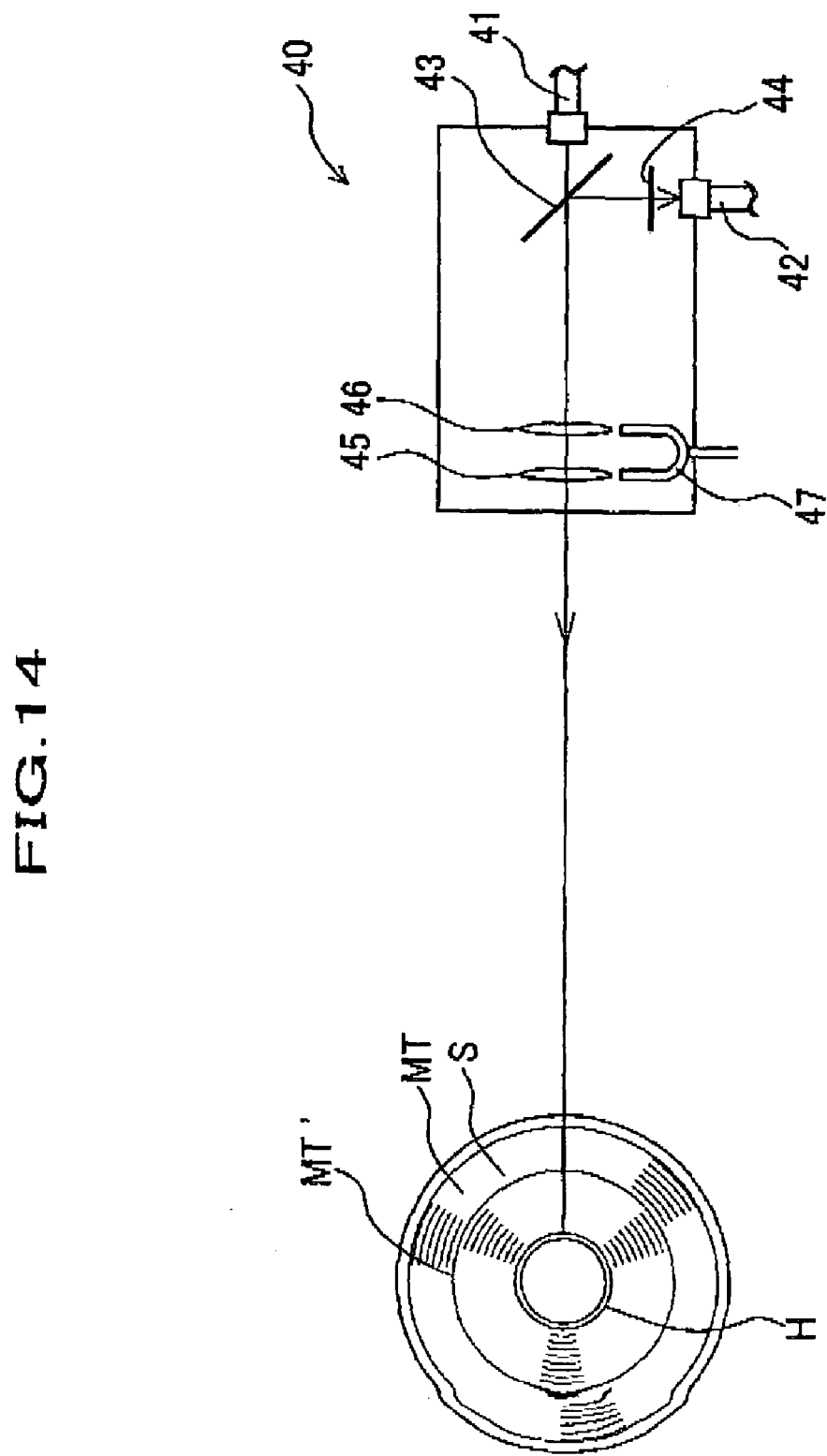
FIG. 14 is a plan view showing other embodiment of the winding appearance inspection device according to this invention.

(2) Also, as shown in FIG. 14, as a winding appearance inspection device 40, for example, a device including laser irradiation device (light projector) 41 that irradiates the light along the winding surface S of the magnetic tape MT, and a receiver 42 that receives the light when focusing on the target object to be irradiated by the laser irradiation device 41, may be adopted.

Specifically, the winding inspection device 40 includes a half mirror 43 formed in a mirror surface state in one side so as to partially transmit the light and partially reflect the light, a pinhole plate 44, lenses 45 and 46, and a tuning fork 47, in addition to the laser irradiation device 41 and the receiver 42. And when laser beam is irradiated from the laser irradiation device 41, the laser beam transmits the half mirror 43 and the lenses 45 and 46, to be reflected by the roll body core H or the projecting magnetic tape MT' on the same optical path. The reflected light transmits the lenses 45 and 46, to be reflected by the half mirror 43 in a predetermined direction, and pass the pinhole of the pinhole plate 44 to be measured in the quantity of the light by the receiver 42.

At this time, the relative position of the lenses 45 and 46 is varied when necessary by high-speed oscillation caused by the tuning fork. Therefore, the quantity of the light received by the receiver 42 is also varied when necessary accordingly. And when the quantity of the light becomes the maximum, that is, when focalized, the relative position of the lenses 45 and 46 are converted into voltage, and the position of the magnetic tape MT' that projects in the controller that is not shown is computed based on the signal. Therefore, by the winding appearance inspection device 40 also, based on the relative distance (focal distance) of the lenses 45 and 46 when focalized, the winding appearance of the magnetic tape MT' that projects from the winding surface S is recognized, to thereby inspect the winding appearance of the magnetic tape MT wound on the roll body core H having a flange.

Furthermore, in the winding appearance device 40, an optical axis is made into one by using the half mirror 43, therefore even if the gap where the roll body core of the tape cartridge of the inspection target can be examined is narrow, the inspection in a good state is possible. In addition, in the winding appearance inspection device 40, the tuning fork 47 is used for oscillating the lenses 45 and 46. However, this invention is not limited thereto, For example, the lenses 45 and 46 may be oscillated by a piezo-electric element or a motor, etc also.

Moreover, the receiver 42, the half mirror 43, the pinhole board 44, lenses 45 and 46, and the tuning fork 47 in the winding appearance inspection device 40 are corresponding to the "image pick-up device" as described in the claims.

(3) In the first embodiment, the winding appearance in the independent tape reel R was inspected. However, this invention is not limited thereto, and similarly to the second and third embodiment, the magnetic tape cartridge C having two reels or the tape cartridge having one reel built therein may be inspected.

Figure 2:
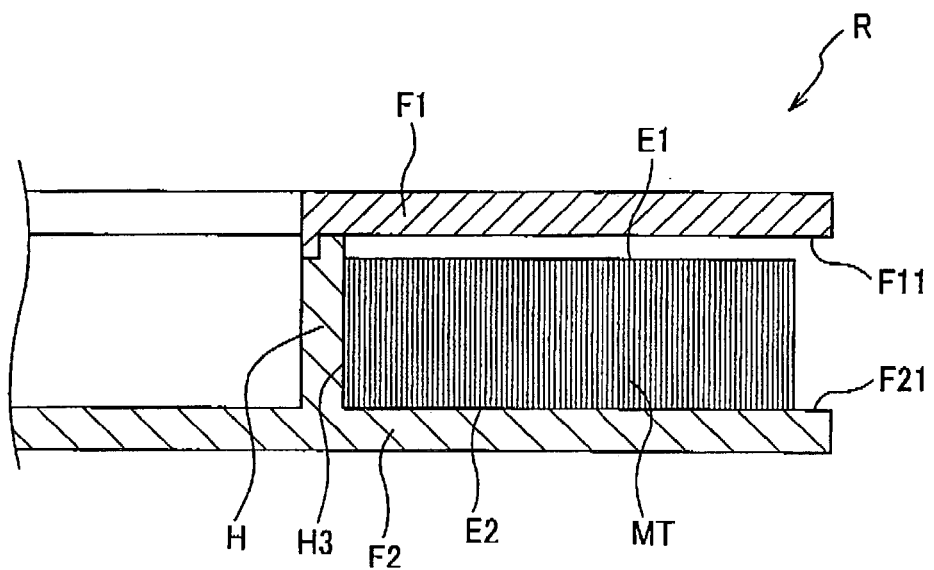
FIG. 2 is a sectional view taken along the line A—A in FIG. 20.
Figure 3:
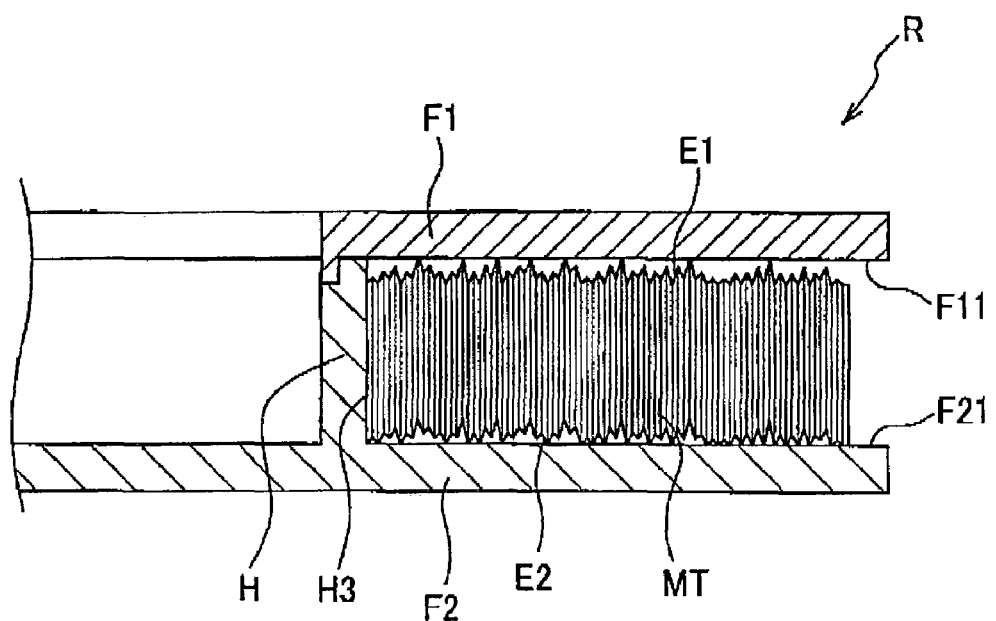
FIG. 3 is a sectional view showing disturbance that is generated in the tape reel shown in FIG. 21.

Also, in case of inspecting the magnetic tape cartridge C having two tape reels R as shown in FIG. 2 and FIG. 3, a mechanism that releases a reel lock mechanism for locking the tape reel R may be provided in each winding appearance inspection device 20 and 30 at the time of not using the magnetic tape cartridge C. Thus, by having the mechanism that releases the lock mechanism, the tape reel R, which is a target object is not shifted from a predetermined measuring position by being urged by the lock mechanism, to allow a good inspection to be performed. Moreover, two sets of light projector 12 and the receiver 13 may be arranged at upside and downside respectively, so as to allow inspection even when the winding position of a tape approaches the center or upside of the roll body core.

(4) The winding appearance inspection device of the tape according to this invention is applicable not only to magnetic tape but all tapes, such as a microfilm, a paper streamer, and an adhesion tape.

Next, preferred embodiment of the magnetic tape winding appearance processing method according to this invention will be explained referring to FIG. 15 to FIG. 22.

Fourth Embodiment

In this embodiment, it is assumed that a predetermined quantity of the magnetic tape MT supplied from pancake is taken up on a tape reel which is a composition part of a magnetic tape cartridge.

Figure 15:
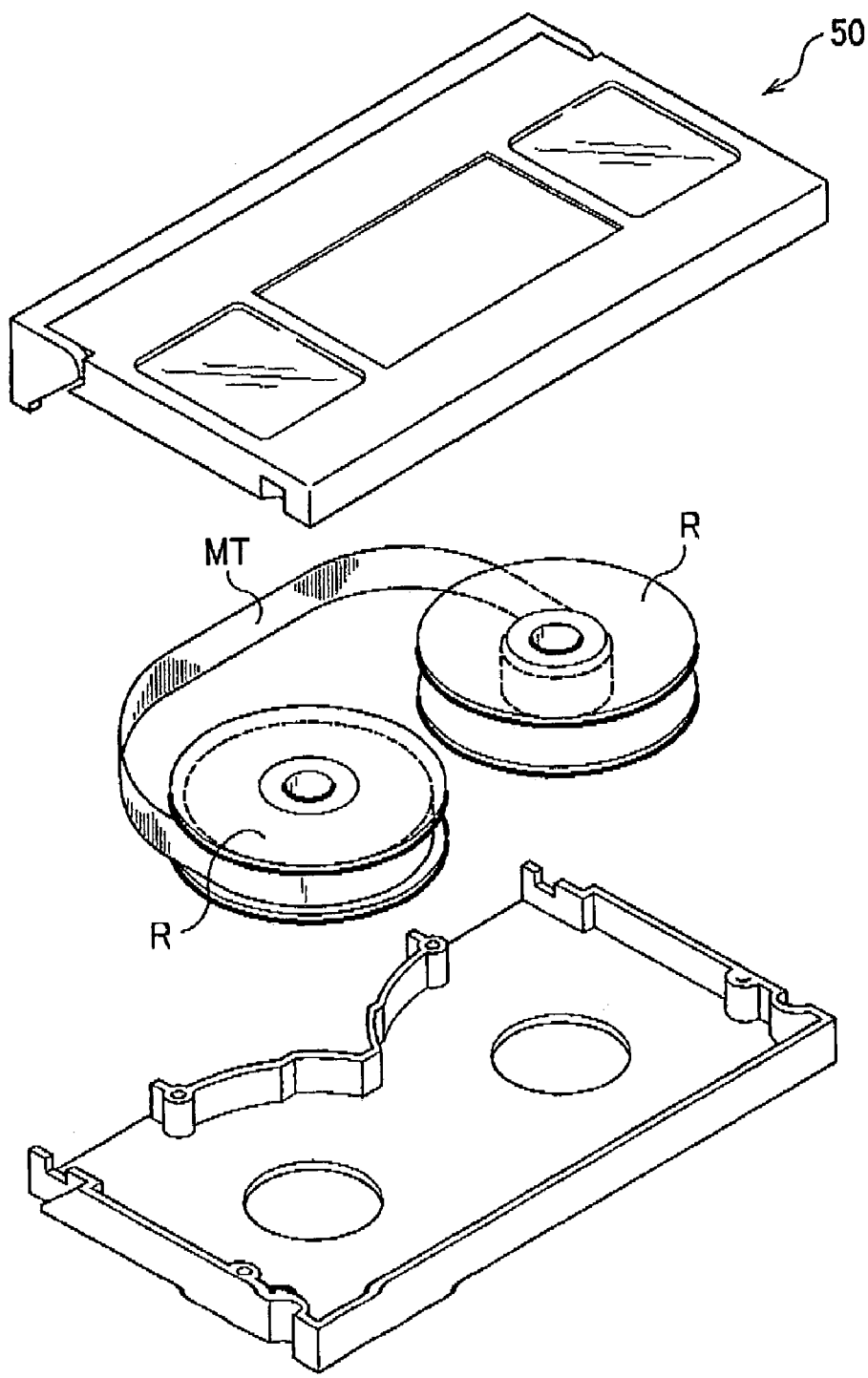
FIG. 15 is a perspective view showing a substantial constitution of a magnetic tape cartridge.

First, a manufacturing process of the magnetic tape cartridge to which the magnetic tape winding appearance improvement processing method is applied, will be explained referring to FIG. 15 and FIG. 16. FIG. 15 is a perspective view showing an outline of the constitution of a magnetic tape cartridge 50. In addition, FIG. 16 is a front view showing a tape winder 51 conceptionally.

Usually, in a manufacturing process of the magnetic tape cartridge 50, a predetermined quantity of the magnetic tape MT supplied from the unprocessed magnetic tape MT is taken up on the tape reel R, as shown in FIG. 15, which is a composition part of the magnetic tape cartridge 50, in a following way.

First, the unprocessed broad magnetic tape manufactured through a color toning process, a coating process, a surface treatment process, is cut into a specified tape width by the standard of the product (magnetic tape cartridge 50), and the so-called "pancake" is manufactured.

Figure 16:
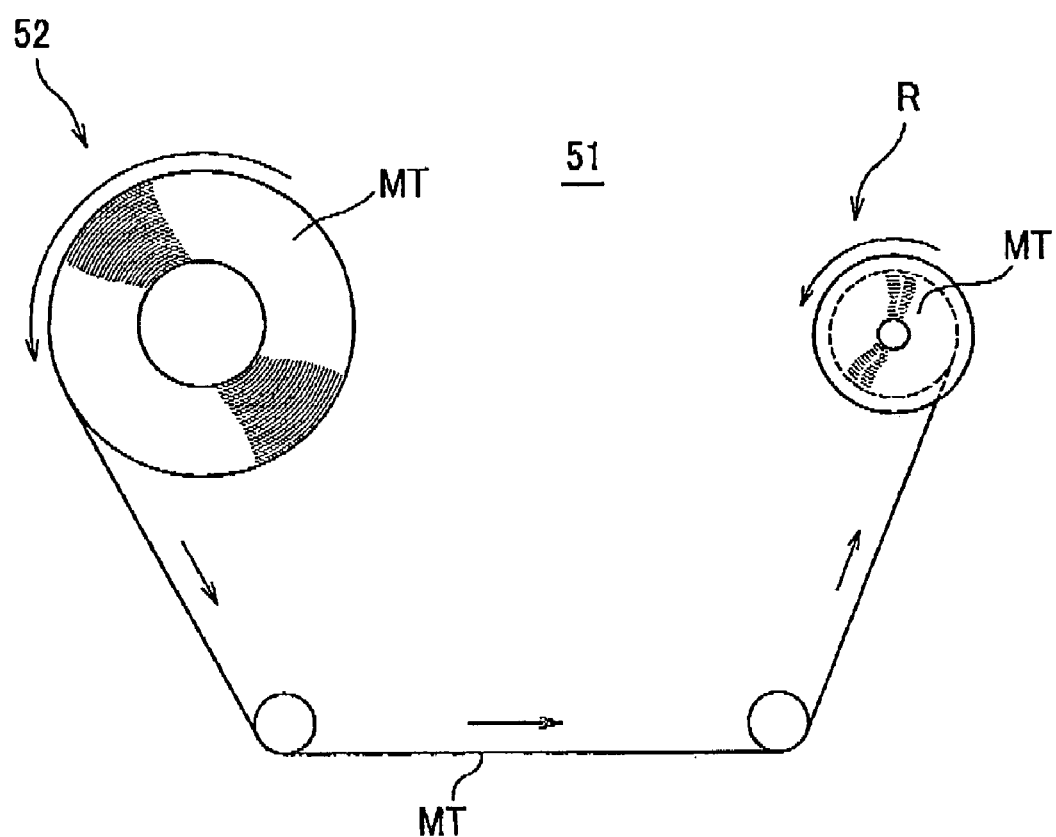
FIG. 16 is a front view conceptionally showing a tape winder.

And as shown in FIG. 16, using the magnetic tape take-up device of the exclusive use called tape winder 51, a predetermined quantity of the magnetic tape MT which is fed out from a pancake 52 is taken up on the tape reel R, and cut.

Figure 17:
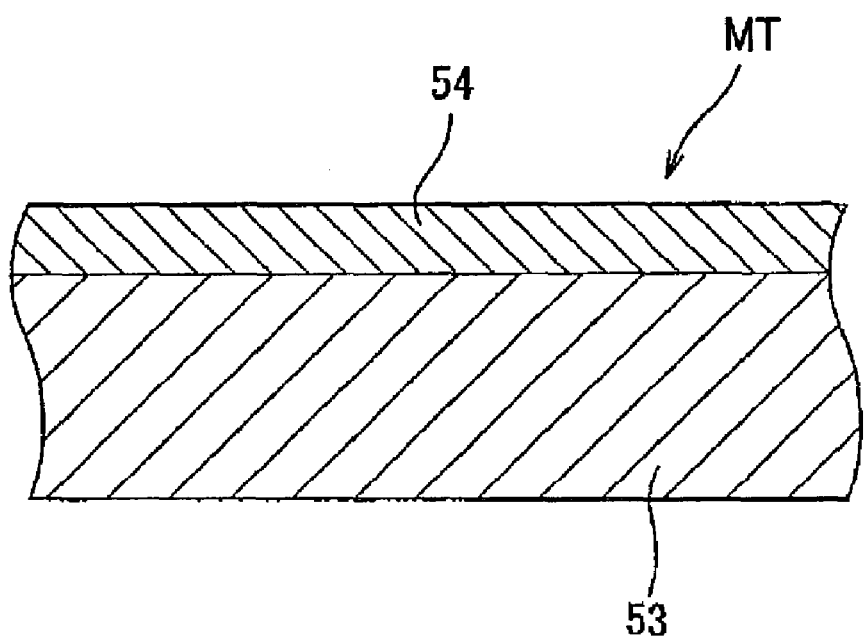
FIG. 17 is a partially enlarged sectional view showing one portion of the magnetic tape MT.

Next, the magnetic tape, to which the winding appearance improvement processing method of the magnetic tape of this invention is applied, will be explained referring to FIG. 17. FIG. 17 is an enlarged sectional view showing some part of the magnetic tape MT.

As shown in FIG. 17, in the magnetic tape MT, the magnetic layer 54 is formed on non-magnetic base (base film) 53. The magnetic layer 54 is formed by coating magnetic paint prepared by mixing magnetic powder, bonding agent, and an organic solvent until the magnetic powder is dispersed uniformly, on the support 53. Or the magnetic layer 54 is formed by coating ferromagnetic materials, such as metal and an alloy, on the support base 53 by means of vacuum vapor deposition and sputtering. In addition, additive agents, such as a dispersant, lubricant, an antistatic agent, a plasticizer, a stabilizer, and a rust preventing agent, are added to the magnetic paint.

As the magnetic powder, for example, a ferromagnetic iron oxide particle, a ferromagnetic iron oxide powder and chromium dioxide, a ferromagnetic metal particle composed of the metal such as Fe, Co, and Ni, and an alloy containing the above metals, and a hexagonal plate-like hexagonal system ferrite particles can be used.

In addition, as the bonding agent, polymers, such as urethane, vinyl chloride, acetic acid vinyl, vinyl alcohol, vinylidene chloride, acrylic acid ester, styrene, butadiene, and acrylonitrile, or the copolymer obtained by combining two or more sorts of the above elements, or polyester resin, and an epoxy resin, etc. can be used.

In addition, as the organic solvent, ether, ester, ketone, aromatic hydrocarbon, aliphatic hydrocarbon, chlorination hydrocarbon, etc. can be used.

And as the material of the support base 53, for example, polyester such as polyethylene terephthalate (PET) and polyethylene naphthalate (PEN), polyolefin such as polypropylene, cellulose derivatives such as nitroglycerine cellulose, high polymers such as polyamide, the polyimide, polyvinyl chloride, and polycarbonate aramid can be used.

As the support base 53, polyester, excellent in processability and machine characteristic at low cost, is preferably used. In addition, polyethylene naphthalate (PEN) with intensity, rigidity, and heat resistance, which are higher than polyethylene terephthalate (PET) is further preferably used. Moreover, aramid is preferably used when heat resistance is not required.

Next, the winding appearance improvement processing method of the magnetic tape of this invention is applied to the manufacturing process of the magnetic tape cartridge 50, wherein a predetermined quantity of magnetic tapes MT fed out from the pancake is taken up on the roll body core H of the tape reel serving as a composition part of the magnetic tape cartridge 50 as shown in FIG. 11 and FIG. 12, said process will be explained below.

Figure 21:
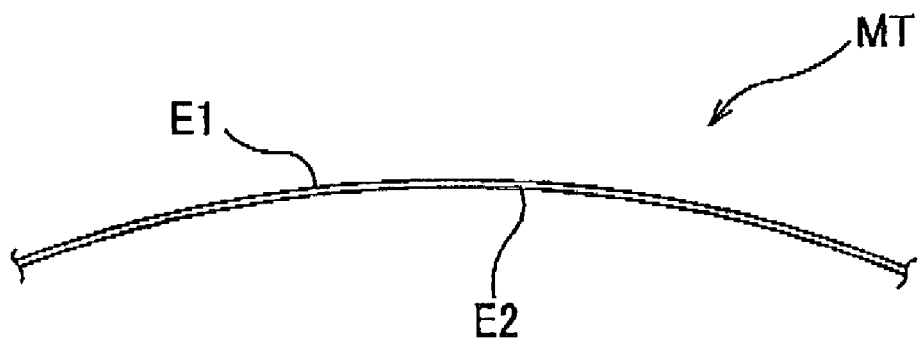
FIG. 21 is a sectional view showing a natural curl of tape edges of a magnetic tape that is formed so as to be curved in the same direction uniformly.

First, as shown in FIG. 16, the magnetic tape MT fed out from the pancake 52 is taken up on the tape reel R by tape winder 51. At this time, the magnetic tape MT is taken up on the roll body core H of the tape reel R in good winding appearance as shown in FIG. 21. Therefore, take-up of the magnetic tape MT is performed at low speed of 2 to 3 m/s. Also, in order to prevent losing air between the magnetic tapes MT, the take-up of the magnetic tape MT is performed under decompression of −85 kPa or less, preferably −95 kPa or less, further preferably −100 to −101 kPa.

Figure 22:
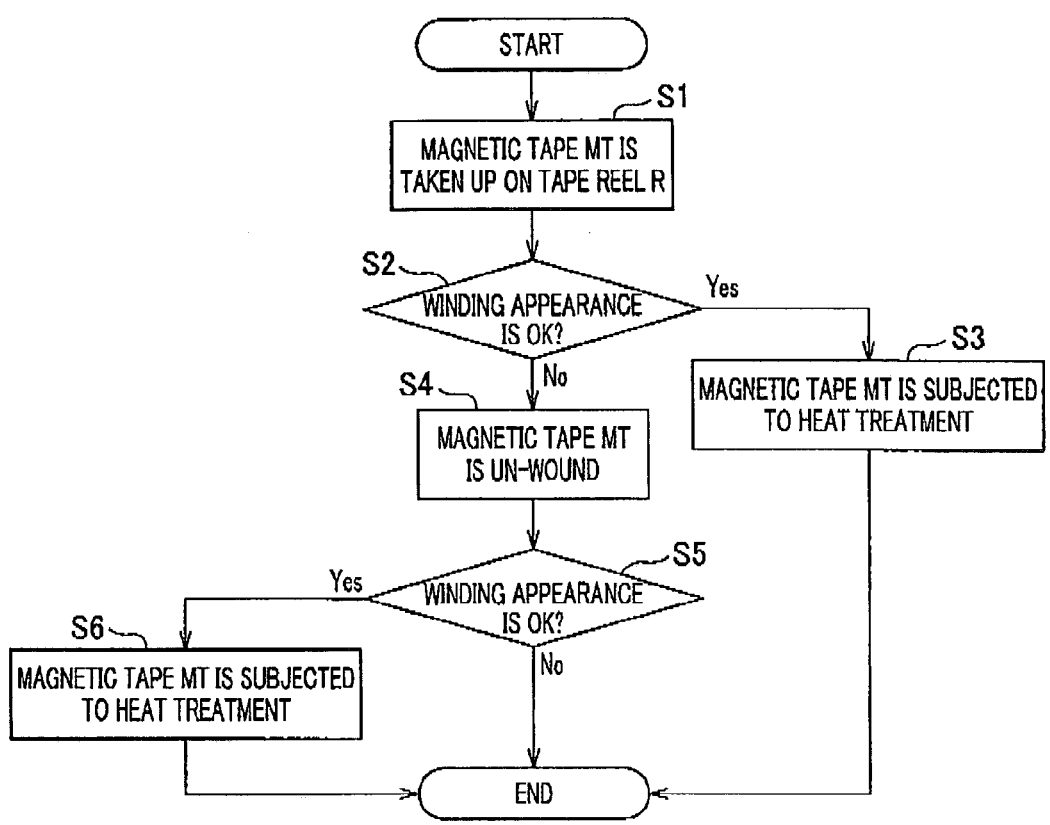
FIG. 22 is a flow chart showing a processing procedure when a winding appearance improvement processing method of the magnetic tape of this invention is applied to a manufacturing process of a magnetic tape cartridge.

Moreover, as shown in FIG. 16, when a predetermined quantity of the magnetic tape MT is taken up on the tape reel R by the tape winder 51, the magnetic tape MT can be taken up on the roll body core H of the tape reel R in a good winding appearance as shown in FIG. 22, when the winding appearance improvement method of the magnetic tape using an endless belt, or the winding appearance improvement method of the magnetic tape using a touch roll. Also, if taking up the magnetic tape, by drawing the magnetic tape in one direction by a magnet, further good winding appearance can be obtained.

Figure 18:
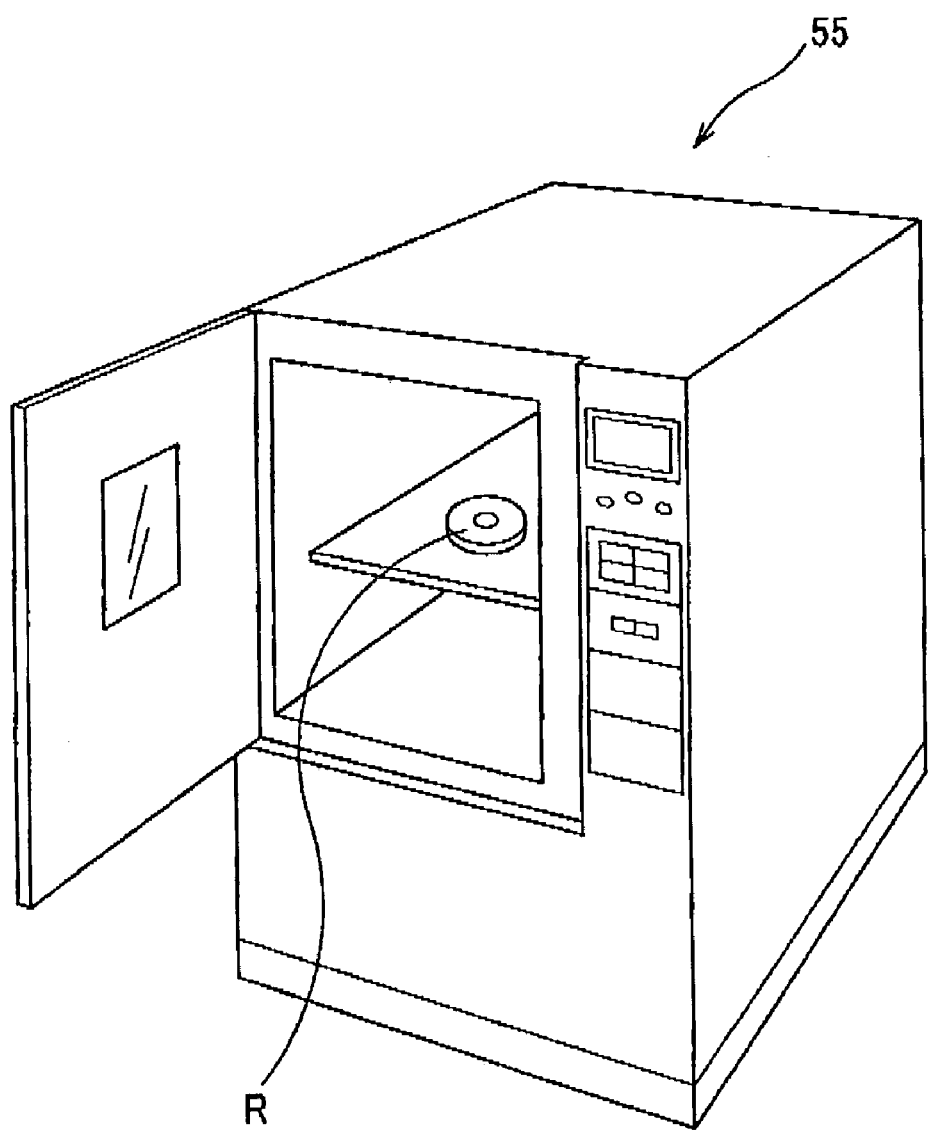
FIG. 18 is a perspective view showing an environmental test device.

And the tape reel R taken up in a good winding appearance as shown in FIG. 2, is placed into environmental test device 65 as shown in FIG. 18. Then, fixed time heat treatment of the magnetic tape MT under a predetermined environmental temperature is applied, to thereby obtain a natural curl formed in a winding appearance of the magnetic tape MT when taken up on the tape reel R, that is, a good winding appearance as shown in FIG. 22. Incidentally, inside of the environmental test device 55 is kept in an environment of low humidity, so that the magnetic tape MT may not be extended by absorbing humidity.

In this embodiment, the environmental test device 55 is used, however a greenhouse or a booth, or the like may be used as long as the fixed time heat treatment of the magnetic tape MT under a predetermined environmental temperature is possible. If the greenhouse and the booth are arranged in the manufacturing process of the magnetic tape cartridge in this case, the productivity of the magnetic tape cartridge can be raised.

Environmental temperature of the environmental test device 55 is set at a temperature just below a glass transition temperature of the material used in the support base 63 of the magnetic tape MT. Specifically, it is set at a temperature lower than a glass transition temperature of the material used in the support base 53 by 0 to 10 degrees C. For example, a glass transition temperature of polyethylene terephthalate (PET) is about 60–70 degrees C., therefore when the polyethylene terephthalate (PET) with glass transition temperature of 69 degrees C. is used for the material of the support base 53, environmental temperature of environmental test device 55 is set to 40–60 degrees C., preferably set to 50–65 degrees C. Moreover, a glass transition temperature of polyethylene naphthalate (PEN) is about 110–120 degrees C., therefore when the polyethylene naphthalate (PEN) with glass transition temperature of 113 degrees C. is used for the material of the support base 53, the environmental temperature of the environmental test device 55 is set to 40–113 degrees C. In addition, it is hard to distinguish a glass transition temperature of aramid clearly, however when the aramid is used for the material of the support base 53, the environmental temperature of the environmental test device 55 is set to 100–120 degrees C. In addition, if the environmental temperature of the environmental test device 55 is set to 100–120 degrees C., processing speed and productivity can preferably be raised.

Thus, the fixed time heat treatment of the magnetic tape MT under a predetermined environmental temperature is applied, to thereby obtain a natural curl of the magnetic tape MT formed in a winding appearance of when taken up on the tape reel R, that is, a good winding appearance as shown in FIG. 21. Especially, when polyethylene terephthalate (PET) and polyethylene naphthalate (PEN) are used for the support base 53 of the magnetic tape MT, the magnetic tape MT is subjected to heat treatment under the environmental temperature just below a glass transition temperature, to thereby form effectively a natural curl. This controls extreme heat contraction by heat-treating the material that constitutes the support base 53 at a temperature just below a glass transition temperature, and at the same time, an amorphous portion is eased so as to be easy to form a moderate curl as reducing residual stress.

As described above, in the manufacturing process of the magnetic tape cartridge 50, after a predetermined quantity of the tape reel R is taken up on the tape reel R, the tape reel R that takes up the magnetic tape MT is placed in the environmental test device 55, as shown in FIG. 18, then the magnetic tape MT is subjected to a heat treatment for a fixed time under a predetermined environmental temperature. Thereby, the magnetic tape MT can be formed effectively in a natural curl into a winding appearance of when the magnetic tape MT is taken up on the tape reel R, that is, into a good winding appearance as shown in FIG. 2. Accordingly, the winding appearance of the magnetic tape can be always maintained satisfactorily, to thereby reduce a disturbed winding appearance of the magnetic tape at the time of using the magnetic tape cartridge 50 constituted including the tape reel R.

Moreover, in this embodiment, in a manufacturing process of the magnetic tape cartridge 50, the case where the magnetic tape MT supplied from the pancake 52 is taken up on the tape reel R was taken for example for explanation. However, the winding appearance improvement processing method of the magnetic tape of this invention is also applied to "Slit process" in which broad unprocessed magnetic tape is cut into the width regulated by the standard of the magnetic tape cartridge 50 and taken up to manufacture a pancake. As described above, when the winding appearance improvement processing method of the magnetic tape of this invention is applied to the slit process, the natural curl is effectively formed in dozens of volumes of the magnetic tapes MT at once, therefore it very efficient.

Figure 20A:
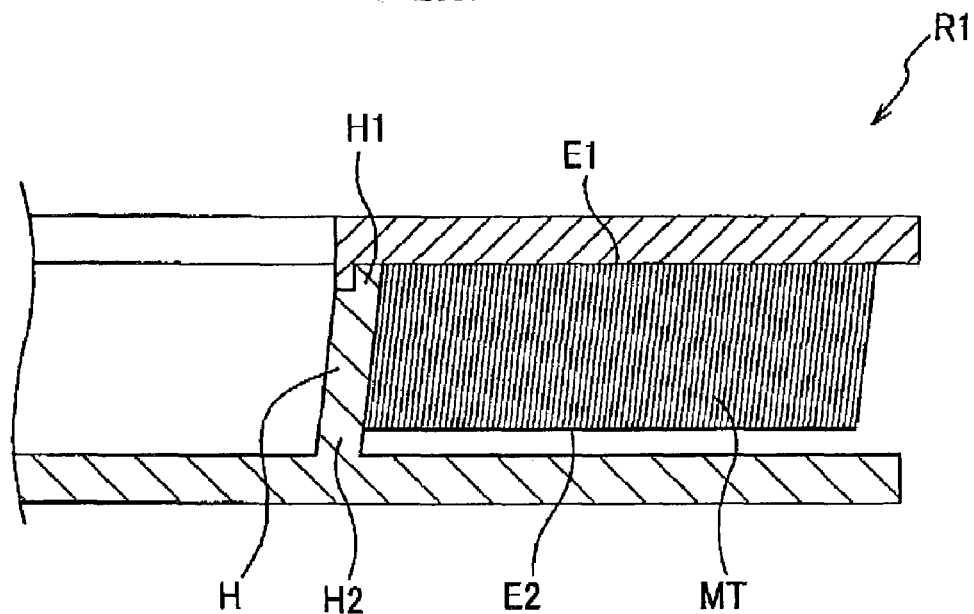
FIG. 20A is a sectional view showing a state of a magnetic tape taken up on a reel which is formed by inclining roll body core.

Moreover, as shown in FIG. 20A, when the magnetic tape MT is subjected to heat-treatment, the heat-treatment may be applied with a state of the magnetic tape MT taken up on the reel R1 having roll body core H that inclines at a predetermined angle from upper end H1 to lower end H2. In the above way, when the magnetic tape MT taken up on the reel R1 is subjected to the heat-treatment, as shown in FIG. 21, a natural curl of the magnetic tape MT can be effectively formed so that tape edges E1 and E2 may be curved uniformly in the same direction. In FIG. 21, a natural curl of the magnetic tape MT is formed so as to be curved toward the tape edge E2.

Figure 20B:
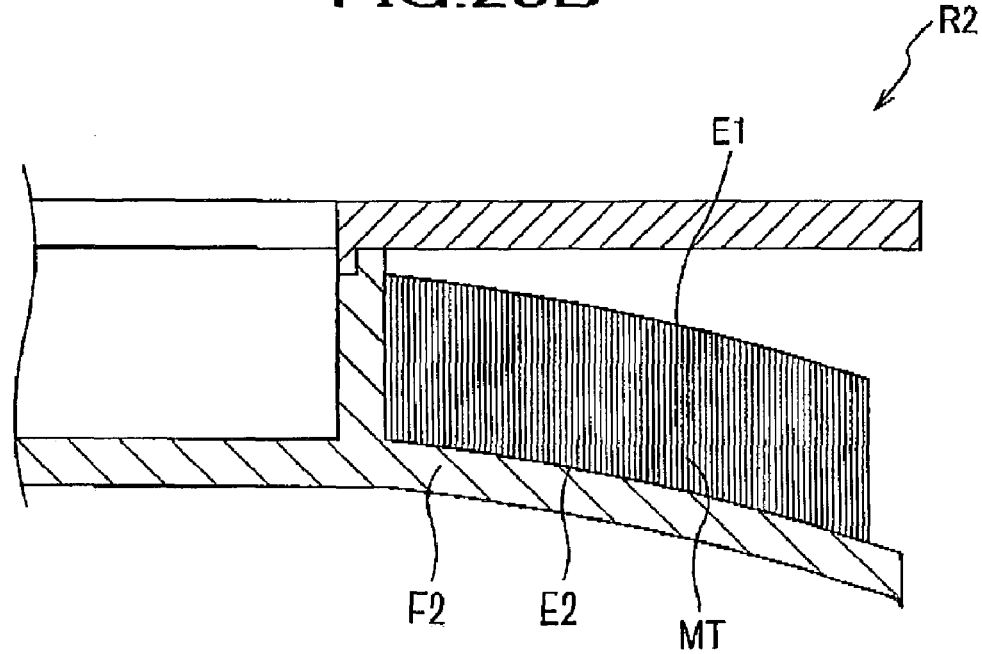

Also, as shown in FIG. 20B, when the magnetic tape MT is subjected to heat-treatment, the magnetic tape MT may be in a state of taken up on the reel 50 having lower flange F2 that is gradually inclined from the inner side to the outer side, biasing toward the lower flange F2. When the magnetic tape MT thus taken up on the reel 50 is subjected to heat-treatment, as shown in FIG. 21, a natural curl of the magnetic tape MT can be effectively formed so that tape edges E1 and E2 may be curved uniformly in the same direction.

Figure 1:
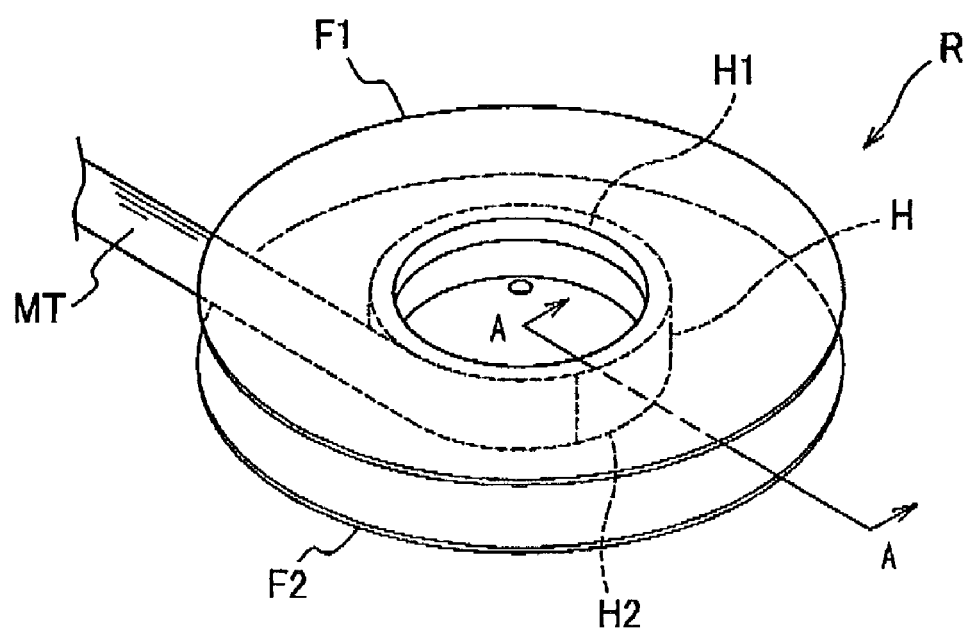
FIG. 1 is a perspective view showing one example of a tape reel.

As described above, if a natural curl of the magnetic tape MT can be effectively formed so that tape edges E1 and E2 may be curved uniformly in the same direction, the magnetic tape MT is taken up on the tape reel R, as shown in FIG. 1 and FIG. 2, in a state of high tension. Therefore, the magnetic tape MT can be taken up in a state of biasing toward the lower flange F2. That is, disturbed winding can be reduced.

In addition, when the magnetic MT with tape edges E1 and E2 thus having a natural curl that is curved uniformly in the same direction (the magnetic tape MT travels in a state of biasing in the same direction (toward the tape edge E2) all the time. Therefore, the magnetic tape MT can be correctly slid on a magnetic head, for example.

Figure 19:
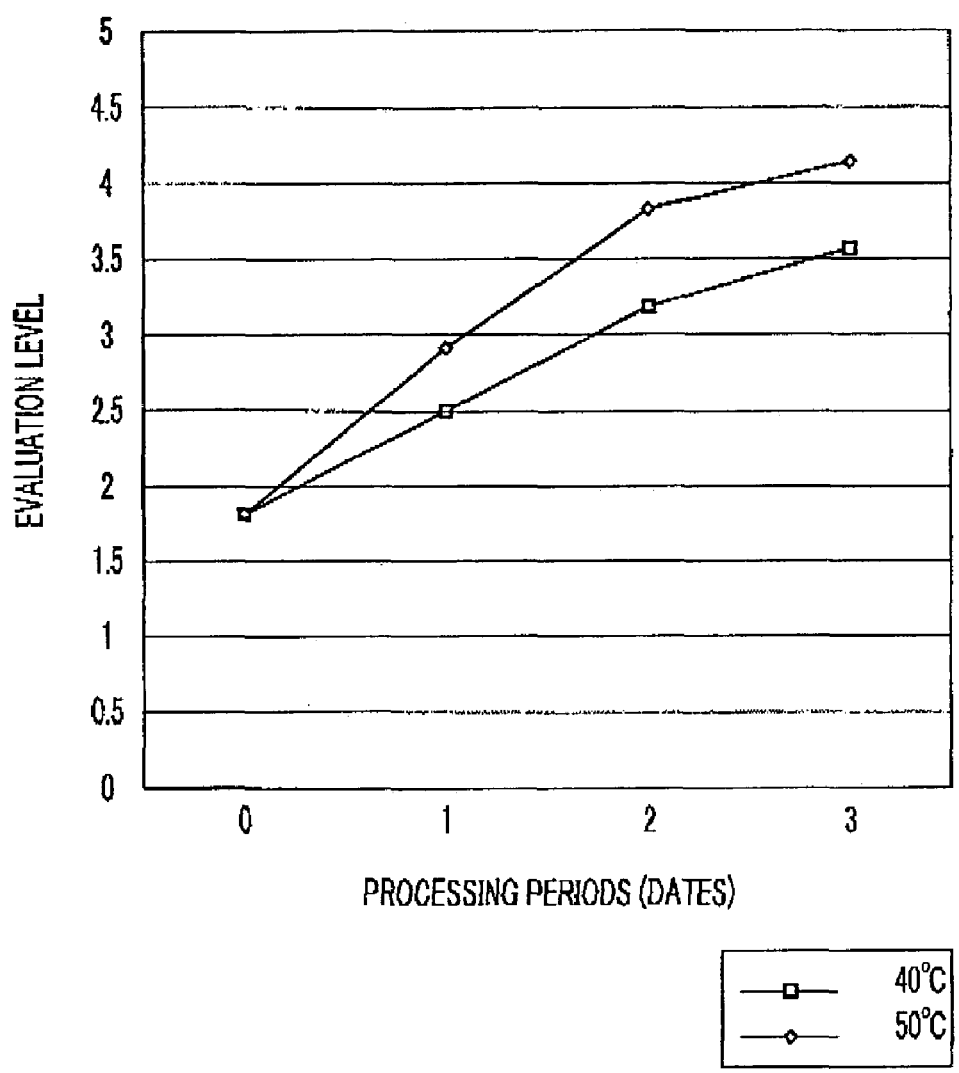
FIG. 19 is a graph showing an experiment result of after heat treatment is applied onto the magnetic tape.

The experiment is performed in such a way that the magnetic tape MT using polyethylene terephthalate (PET) for the material of the support base 53 is subjected to a fixed time of heat-treatment under a predetermined environmental temperature. And the example of this experiment will be explained. FIG. 19 is a graph showing an experiment result in which the magnetic tape is subjected to heat-treatment.

First, the magnetic tape MT is taken up on the roll body core H of the tape reel R in a good winding appearance shown in FIG. 21 by using tape winder 51 shown in FIG. 19 at low winding speed of 2 m/s, under decompression of −90 kPa.

Subsequently, the tape reel R taken up on the magnetic tape MT is placed in an environmental test device 55 as shown in FIG. 18, to be subjected to heat-treatment for a fixed time. Here, a processing period (days) was set in four cases of zero day (heat-treatment is not applied), one day, two days, and three days. In addition, the environmental temperature of heat-treatment applied to the magnetic tape MT was set to 40 degrees C., and 50 degrees C.

Next, the magnetic tape MT subjected to heat-treatment by the environmental test device 55 was un-wound once from the tape reel R by the general driving device, then taken-up on the tape reel again.

And the winding appearance of the magnetic tape MT taken-up on the tape reel R is inspected visibly. The inspection of the winding appearance of the magnetic tape MT was performed in such a manner that the unevenness of the tape edges of the magnetic tape MT was examined, and when no projection of the magnetic tape occurred it was graded as "5", when a minute projection of 0.05 mm or less-was occurred, it was graded as "4", when about 0.2 mm of projection occurred at the position of ⅓ of the roll body core H side, it was graded as "3", when the projection of 0.3 mm or more-was occurred, it was graded as "2", when three or more of projections of 0.3 mm or more-was occurred, it was graded as "1", and in case of "3" or more, it was regarded as success.

As shown in a graph of FIG. 19, the inspection of the magnetic tape MT subjected to heat-treatment at environmental temperature of 40 degrees C. in such a manner that when the number of processing dates was zero day, it was set as "1.8", when the number of processing dates were one day, it was set as "2.5", when the number of processing dates were two days, it was set as "3.2" and the number of processing dates were three days, it was set as "3.6". This clarified that when the magnetic tape MT is subjected to heat-treatment at environmental temperature of 40 degrees C., at least 2 days or more, preferably three days or more of processing days are required.

Also, as shown in FIG. 19, the inspection of the magnetic tape MT subjected to heat-treatment at environmental temperature of 50 degrees C., when the number of processing dates were zero day, it is set as "1.8", when the number of processing dates were one day, it is set as "2.9", when the number of processing dates were two days, it is set as "3.8", and when the number of processing dates were three days, it is set as "4.2". This clarified that the magnetic tape MT is subjected to heat-treatment at environmental temperature of 50 degrees C., at least one day or more, preferably two days or more of processing days are required.

Fifth Embodiment

In this embodiment, a processing procedure of the winding posture improvement processing method of the magnetic tape of this invention that is applied to the manufacture process of the magnetic tape cartridge 50, will be explained referring to a flow chart of FIG. 22. Incidentally, here, it is assumed that a case where a predetermined quantity of the magnetic tape MT is taken up on the roll body core H of the tape reel R, which is the composition parts of the magnetic tape cartridge 50 as shown in FIG.20.

First, in step S1, as shown in FIG. 16, a predetermined quantity of magnetic tape MT fed out from the pancake 52 is taken up on the tape reel R by the tape winder 51. At this time, the magnetic tape MT is taken up at a high taking-up speed of 10 to 20 m/s.

In the next step S2, the inspection of the winding appearance of the magnetic tape MT taken up on the tape reel R is performed visibly. Incidentally, the inspection of the winding appearance of the magnetic tape MT can also be conducted by an optical sensor, ultrasonic wave, X-rays, or the like besides viewing. The winding appearance inspection of the magnetic tape MT is conducted in such a way that when examining the unevenness of the tape edges of the magnetic tape MT to find 0.3 mm or more of projection from the tape edge, it is regarded as "failure", and in the other case, it is regarded as "success". And when the inspection result obtained by step S2 was "success", it is progressed to step S3, and when the inspection result was "failure", it is progressed to step S4.

In step S3, the magnetic tape MT is subjected to heat-treatment at a temperature just below a glass transition temperature of the material used for a support base 53 (see FIG. 14) of the magnetic tape MT, so that a natural curl may be effectively formed in a state of the winding appearance when taken up on the tape reel R. After the natural curl of the magnetic tape MT is formed by step S3, the whole processes are completed.

In step S4, the magnetic tape MT is un-wound on the tape reel R in a good winding appearance as shown in FIG. 2, at low taking-up speed of 2 to 3 m/s. At this time, in order to prevent air from mixing in between the magnetic tapes MT, the take-up of the magnetic tape MT is preferably performed under decompression of 85 to 100 Kpa.

And in the next step S5, the winding appearance of the magnetic tape MT taken up on the tape reel R is inspected visibly again. The inspection of the step S5 is performed in the same way as the inspection of the step S2. Then, when the inspection result obtained by step S5 was "Success", it is progressed to the next step S6, and when the inspection result is "Failure", the magnetic tape MT is regarded as inferior goods and the whole processes are completed.

In step S6, similarly to the step S3, the magnetic tape MT is subjected to heat-treatment at a temperature just below a glass transition temperature of the material used for a support base 53 (see FIG. 14) of the magnetic tape MT, so that a natural curl may be effectively formed in a state of the winding appearance when taken up on the tape reel R. And after the natural curl is formed in the magnetic tape MT by step S6, the whole processes are completed.

As described above, after taking up a predetermined quantity of the magnetic tape MT on the tape reel R by the tape winder 51, the winding appearance of the magnetic tape MT taken up on the tape reel R is inspected, to thereby sort out a good winding appearance of the magnetic tape MT. In addition, even when the inspection result is "Failure", after the magnetic tape MT is un-wound on the tape reel R at lower taking-up speed than the first taking-up speed, the winding appearance of the magnetic tape MT taken up on the tape reel R is inspected again, to thereby sort out a good winding appearance of the magnetic tape MT.

Therefore, pluralities of magnetic tapes MT formed in a good winding appearance can be sorted out compared with the conventional winding appearance. And by the time such magnetic tapes MT are delivered to users, the good winding appearance of the magnetic tapes MT is obtained. Therefore, when a user uses such magnetic tape MT, stable traveling of the magnetic tape MT is achieved, to thereby keep a record reproduction feature of the magnetic tape MT in a good state.

And when the inspection result is "Success", the magnetic tape MT is subjected to heat-treatment at a temperature just below a glass transition temperature of the material used for a support base 53 of the magnetic tape MT, so that a natural curl may be effectively formed in a state of the winding appearance when taken up on the tape reel R. Accordingly, the winding appearance of the magnetic tape MT is maintained satisfactorily as shown in FIG. 21 all the time, therefore when using the tape cartridge 50 constituted including the tape reel R, the occurrence of disturbance in traveling of the tape MT is avoided.

Moreover, in this embodiment, the magnetic tape MT is subjected to heat-treatment at a temperature just below a glass transition temperature of the material used for a support base 53 of the magnetic tape MT, so that a natural curl may be effectively formed in a state of the winding appearance when taken up on the tape reel R. However, the heat-treatment is not necessarily applied. Especially, as for the magnetic tape MT capable or obtaining a good winding appearance even when taken up at high speed, there is no necessity of heat-treating. However, by applying the heat-treatment, the good winding appearance is obtained.

In addition, in this embodiment, the inspection of the winding appearance is performed visibly. However, the inspection is not limited thereto, the winding appearance inspection device of a tape as described in the first embodiment and the second embodiment may also be used.

What is claimed is:

1. A winding appearance inspection device of a tape wound on a roll body core, comprising:
    a light projector that irradiates a light that at least partially passes near the roll body core along a winding surface of the tape, such that the light is irradiated in alignment with the winding surface of the tape; and
    a receiver that receives the light irradiated from the light projector.

2. The winding appearance inspection device of the tape wound on a roll body core as described in claim 1, wherein:
    the light projector irradiates light along a winding surface of the tape;
    the receiver receives the light from the light projector, reflected by the tape projected from the winding surface, and
    the position of the tape that projects from the winding surface is recognized by measuring the position of the light received by the receiver, a quantity of the light, or time taking the light irradiated from the light projector to be received by the receiver.

3. The winding appearance inspection device of the tape wound on a roll body core as described in claim 1, wherein:
    the light projector irradiates the light along the winding surface of the tape;
    the receiver, that receives light from the light projector, focuses on the tape that projects from the winding surface, and
    based on a focal distance when focalizing by the receiver, a position of the tape that projects from the winding surface is recognized.

4. The winding appearance inspection device of the tape wound on the roll body core as described in claim 1, wherein the receiver receives light which is reflected by the roll body core or tape that projects from the winding surface of the tape, and
    wherein, based on an image imaged by the receiver, the winding appearance of the tape is inspected.

5. The winding appearance inspection device according to claim 1, wherein the light irradiated from the light projector is projected in the same direction as the winding surface of the tape, so as to pass along the winding surface.

6. The winding appearance inspection device according to claim 1, wherein the roll body core comprises an opaque flange at respective upper and lower ends of the roll body core.

7. A winding appearance inspection device of a tape wound on a roll body core, comprising:
    a light projector that irradiates a light that at least partially passes near the roll body core along a winding surface of the tape;
    a receiver that receives the light irradiated from the light projector,
    wherein a light-emitting face of the light projector opposes a light-receiving face of the receiver.

8. The winding appearance inspection device according to claim 7, wherein a width of the light irradiated from the light projector extends in a range from the winding surface of the tape to a flange of the roll body core, wherein the flange opposes the winding surface of the tape.

* * * * *